US010148453B2

United States Patent
Batra et al.

(10) Patent No.: US 10,148,453 B2
(45) Date of Patent: Dec. 4, 2018

(54) USING UPDATE SLOT TO SYNCHRONIZE TO BLUETOOTH LE ISOCHRONOUS CHANNEL AND COMMUNICATE STATE CHANGES

(71) Applicant: QUALCOMM Incorporated, San Diego, CA (US)

(72) Inventors: Mayank Batra, Cambridge (GB); Robin Heydon, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 15/255,313

(22) Filed: Sep. 2, 2016

(65) Prior Publication Data

US 2017/0244576 A1    Aug. 24, 2017

Related U.S. Application Data

(60) Provisional application No. 62/299,524, filed on Feb. 24, 2016.

(51) Int. Cl.
| | | |
|---|---|---|
| *H04J 3/00* | (2006.01) | |
| *H04J 3/06* | (2006.01) | |
| *H04L 12/40* | (2006.01) | |
| *H04W 56/00* | (2009.01) | |
| *H04W 4/80* | (2018.01) | |
| *H04W 4/00* | (2018.01) | |

(52) U.S. Cl.
CPC ....... *H04L 12/40058* (2013.01); *H04W 4/008* (2013.01); *H04W 4/80* (2018.02); *H04W 56/00* (2013.01); *H04W 56/0025* (2013.01)

(58) Field of Classification Search
CPC .. H04L 12/40058; H04W 4/80; H04W 4/008; H04W 56/00; H04W 56/0025
USPC ...................... 370/350, 503–520; 375/240.28
See application file for complete search history.

(56) References Cited

U.S. PATENT DOCUMENTS 5,208,807 A    5/1993 Gass et al.
5,526,353 A *  6/1996 Henley ............... H04L 12/1813
                                                    370/392

(Continued)

FOREIGN PATENT DOCUMENTS

EP    2587868 A2    5/2013
FR    2863129 A1 *  6/2005 ......... H04L 12/2803

(Continued)

OTHER PUBLICATIONS

Bluetooth, "Specification of the Bluetooth System", Covered Core Package version: 4.2, Dec. 2, 2014, 2772 pages.

(Continued)

*Primary Examiner* — Thai D Hoang
(74) *Attorney, Agent, or Firm* — Muncy, Geissler, Olds & Lowe, P.C./Qualcomm

(57) ABSTRACT

According to various aspects, an isochronous channel may include an update slot in which a source device may schedule a transmission to broadcast control information to one or more sink devices. As such, a sink device may initially listen to a periodic advertising stream to receive synchronization information to acquire or re-acquire the isochronous channel and subsequently synchronize to the isochronous channel according to state information that the source device conveys in the update slot.

27 Claims, 11 Drawing Sheets

(56) References Cited

U.S. PATENT DOCUMENTS

| | | | | |
|---|---|---|---|---|
| 6,097,499 | A * | 8/2000 | Casey | G06F 3/1293 |
| | | | | 358/1.16 |
| 6,590,865 | B1 * | 7/2003 | Ibaraki | H04L 12/40058 |
| | | | | 370/230 |
| 7,929,447 | B2 | 4/2011 | Bardini et al. | |
| 2001/0024445 | A1 * | 9/2001 | Noda | H04L 12/40058 |
| | | | | 370/402 |
| 2001/0044861 | A1 * | 11/2001 | Niwa | H04L 12/4625 |
| | | | | 710/22 |
| 2002/0114462 | A1 * | 8/2002 | Kudo | G11B 20/00086 |
| | | | | 380/203 |
| 2006/0239296 | A1 * | 10/2006 | Jinzaki | H04L 12/40058 |
| | | | | 370/468 |
| 2013/0070860 | A1 * | 3/2013 | Schramm | H04J 3/0682 |
| | | | | 375/240.25 |
| 2014/0198726 | A1 | 7/2014 | Xu et al. | |
| 2015/0245369 | A1 | 8/2015 | Heydon | |
| 2015/0312858 | A1 | 10/2015 | Kerai | |

FOREIGN PATENT DOCUMENTS

| | | |
|---|---|---|
| WO | 0152466 A1 | 7/2001 |
| WO | 2016003064 A1 | 1/2016 |

OTHER PUBLICATIONS

International Search Report and Written Opinion—PCT/US2017/013334—ISA/EPO—dated May 24, 2017.

* cited by examiner

USING UPDATE SLOT TO SYNCHRONIZE TO BLUETOOTH LE ISOCHRONOUS CHANNEL AND COMMUNICATE STATE CHANGES

CROSS-REFERENCE TO RELATED APPLICATION

The present application for patent claims the benefit of U.S. Provisional Application No. 62/299,524, entitled "USING UPDATE SLOT TO SYNCHRONIZE TO BLUETOOTH LE ISOCHRONOUS CHANNEL AND COMMUNICATE STATE CHANGES," filed Feb. 24, 2016, assigned to the assignee hereof, and expressly incorporated herein by reference in its entirety.

TECHNICAL FIELD

The various aspects and embodiments described herein generally relate to streaming isochronous data, and in particular, to using an update slot to convey state information related to an isochronous channel in which a source device broadcasts isochronous data to one or more sink devices.

BACKGROUND

Wireless devices operating in the "Bluetooth" wireless communication spectrum are proliferating. In particular, the term "Bluetooth" generally refers to and defines a relatively short range wireless communication protocol, with an operating range ranging from a few meters to a few tens of meters. The Bluetooth specification includes various profiles that define the behavior associated with each communication endpoint to implement a specific use case. Several such use cases are contemplated in the Bluetooth specification, which are generally defined according to a protocol stack that promotes and allows interoperability between endpoint devices from different manufacturers through enabling applications to discover and use services that other nearby Bluetooth devices may be offering.

In that context, the Bluetooth specification defines device role pairs that together form a single use case called a profile. One example profile defined in the Bluetooth specification is the Handsfree Profile (HFP) for voice telephony, in which one device implements an Audio Gateway (AG) role and the other device implements a Handsfree (HF) device role. Another example is the Advanced Audio Distribution Profile (A2DP) for high-quality audio streaming, in which one device implements an audio source device (SRC) role and another device implements an audio sink device (SNK) role. For a commercial Bluetooth device that implements one role in a profile to function properly, another device that implements the corresponding role must be present within the radio range of the first device. For example, in order for an HF device such as a Bluetooth headset to function according to the Handsfree Profile, a device implementing the AG role (e.g., a cell phone) must be present within radio range. Likewise, in order to stream high-quality mono or stereo audio according to the A2DP, a device implementing the SNK role (e.g., Bluetooth headphones or Bluetooth speakers) must be within radio range of a device implementing the SRC role (e.g., a stereo music player).

The Bluetooth specification defines a layered data transport architecture and various protocols and procedures to handle data communicated between two devices that implement a particular profile use case. For example, various logical links are available to support different application data transport requirements, with each logical link associated with a logical transport having certain characteristics (e.g., flow control, acknowledgement/repeat mechanisms, sequence numbering, scheduling behavior, etc.). However, up to the Bluetooth 4.2 specification, Bluetooth Low Energy does not have specific support for isochronous data or flushing data. Accordingly, the Bluetooth Special Interest Group (SIG) has proposed to add isochronous data support to Bluetooth Low Energy, sometimes alternatively referred to as Bluetooth LE, BLE, BTLE, or Bluetooth Smart. In one proposed use case, one device called a "master" may broadcast isochronous data (e.g., time-bounded audio) to one or multiple "slave" devices via an Isochronous Connectionless (ICL) channel. To acquire (or reacquire) an ICL channel, a receiving device first needs to synchronize to a periodic advertising stream that points to the ICL channel. When the ICL channel changes to an inactive state (e.g., because audio has been paused), the receiving device generally remains synchronized to the periodic advertising stream such that once the ICL channel again becomes active, the receiving device will be notified via information conveyed in the periodic advertising stream. However, the proposed approach to convey ICL channel state changes via the periodic advertising stream is sub-optimal for various reasons. For example, because the receiver is required to switch between listening to the periodic advertising stream and the ICL channel, additional resources (e.g., memory and power) are consumed and latency increases, which can substantially interfere with performance especially on resource-constrained devices (e.g., with respect to available memory, power, etc.).

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, the Bluetooth Special Interest Group (SIG) has proposed to add isochronous data support to Bluetooth Low Energy (LE) in order to allow Bluetooth LE devices to transfer isochronous (time-bounded) data, which generally refers to information in a stream where each information entity is bound to previous and successive entries according to a time relationship. One proposed use case involves broadcasting the same isochronous data (e.g., audio) to multiple devices via an Isochronous Connectionless (ICL) channel. In order to acquire or reacquire an ICL channel, a receiving device first needs to synchronize to a periodic advertising stream that points to the ICL channel. When the ICL channel changes states (e.g., because audio has been paused), the receiver may remain synchronized to the periodic advertising stream such that once the ICL channel again becomes active, the receiving device will be notified via the periodic advertising stream. However, conveying the ICL channel state changes via the periodic advertising stream is sub-optimal because the receiver is required to switch between listening to the periodic advertising stream and the ICL channel, thereby consuming additional resources (e.g., memory and power) and increasing latency, which can interfere with performance. However, the ICL channel also includes an "update slot" (also called an "update sub-event") that a broadcaster can use to send occasional control information to the receiving devices. As such, according to various aspects, the update slots can be used to synchronize to a Bluetooth isochronous channel (e.g., an ICL channel), thereby dispensing with the requirement that the receiver device continually listen to the periodic advertising stream after the isochronous channel has been acquired (or re-acquired). In particular, an ICL stream may include an update sub-event that provides a mechanism to allow the broadcaster to update all receiving devices with control information (e.g., a new automatic frequency hopping (AFH) channel map), wherein the broadcaster may schedule the update sub-event within the ICL stream when the information needs to be sent to the receiving devices. The receiving device may therefore check the status associated with an update flag in the data packet received in the ICL channel to schedule receiving the control packet in the update sub-event. Accordingly, the receiving devices may directly synchronize to the update sub-event that the broadcaster uses to send occasional control information to the receiving devices, thereby dispensing with the requirement to have the receiving devices continue to listen to the periodic advertising stream after the ICL channel has been acquired (or re-acquired). As such, whenever the ICL channel transitions to or from an active state, an inactive state, or a terminated state, the broadcaster may convey the appropriate state change via the update sub-event.

According to various aspects, a method for synchronizing to an isochronous channel is described herein. In one example, the method may comprise receiving, at a sink device, synchronization information associated with the isochronous channel via an advertising channel, acquiring, at the sink device, the isochronous channel according to the synchronization information received via the advertising channel, and synchronizing to the isochronous channel according to state information that a source device broadcasts in an update slot associated with the isochronous channel to indicate whether isochronous data is present on the isochronous channel.

According to various aspects, a wireless device as described herein may comprise a receiver configured to receive synchronization information associated with an isochronous channel via an advertising channel and one or more processors configured to acquire the isochronous channel according to the synchronization information received via the advertising channel and to synchronize to the isochronous channel according to state information that a source device broadcasts in an update slot associated with the isochronous channel to indicate whether isochronous data is present on the isochronous channel.

According to various aspects, an apparatus as described herein may comprise means for receiving synchronization information associated with an isochronous channel via an advertising channel, means for acquiring the isochronous channel according to the synchronization information received via the advertising channel, and means for synchronizing to the isochronous channel according to state information that a source device broadcasts in an update slot associated with the isochronous channel to indicate whether isochronous data is present on the isochronous channel.

According to various aspects, a computer-readable storage medium as described herein may comprise code for causing a wireless device to receive synchronization information associated with an isochronous channel via an advertising channel, acquire the isochronous channel according to the synchronization information received via the advertising channel, and synchronize to the isochronous channel according to state information that a source device broadcasts in an update slot associated with the isochronous channel to indicate whether isochronous data is present on the isochronous channel.

According to various aspects, a method for conveying a state related to an isochronous channel is further disclosed herein. In one example, the method may comprise broadcasting, by a source device, synchronization information associated with the isochronous channel via an advertising channel and broadcasting, by the source device, state information related to the isochronous channel in an update slot associated with the isochronous channel, wherein the state information indicates whether isochronous data is present on the isochronous channel.

According to various aspects, a wireless device as described herein may comprise one or more processors configured to determine synchronization information associated with an isochronous channel and state information related to the isochronous channel and a transmitter configured to broadcast the synchronization information associated with the isochronous channel via an advertising channel and to broadcast the state information related to the isochronous channel in an update slot associated with the isochronous channel, wherein the state information indicates whether isochronous data is present on the isochronous channel.

According to various aspects, an apparatus as described herein may comprise means for broadcasting synchronization information associated with an isochronous channel via an advertising channel and means for broadcasting state information related to the isochronous channel in an update slot associated with the isochronous channel, wherein the state information indicates whether isochronous data is present on the isochronous channel.

According to various aspects, a computer-readable storage medium as described herein may comprise code for causing a wireless device to broadcast synchronization information associated with an isochronous channel via an advertising channel and broadcast state information related to the isochronous channel in an update slot associated with the isochronous channel, wherein the state information indicates whether isochronous data is present on the isochronous channel.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
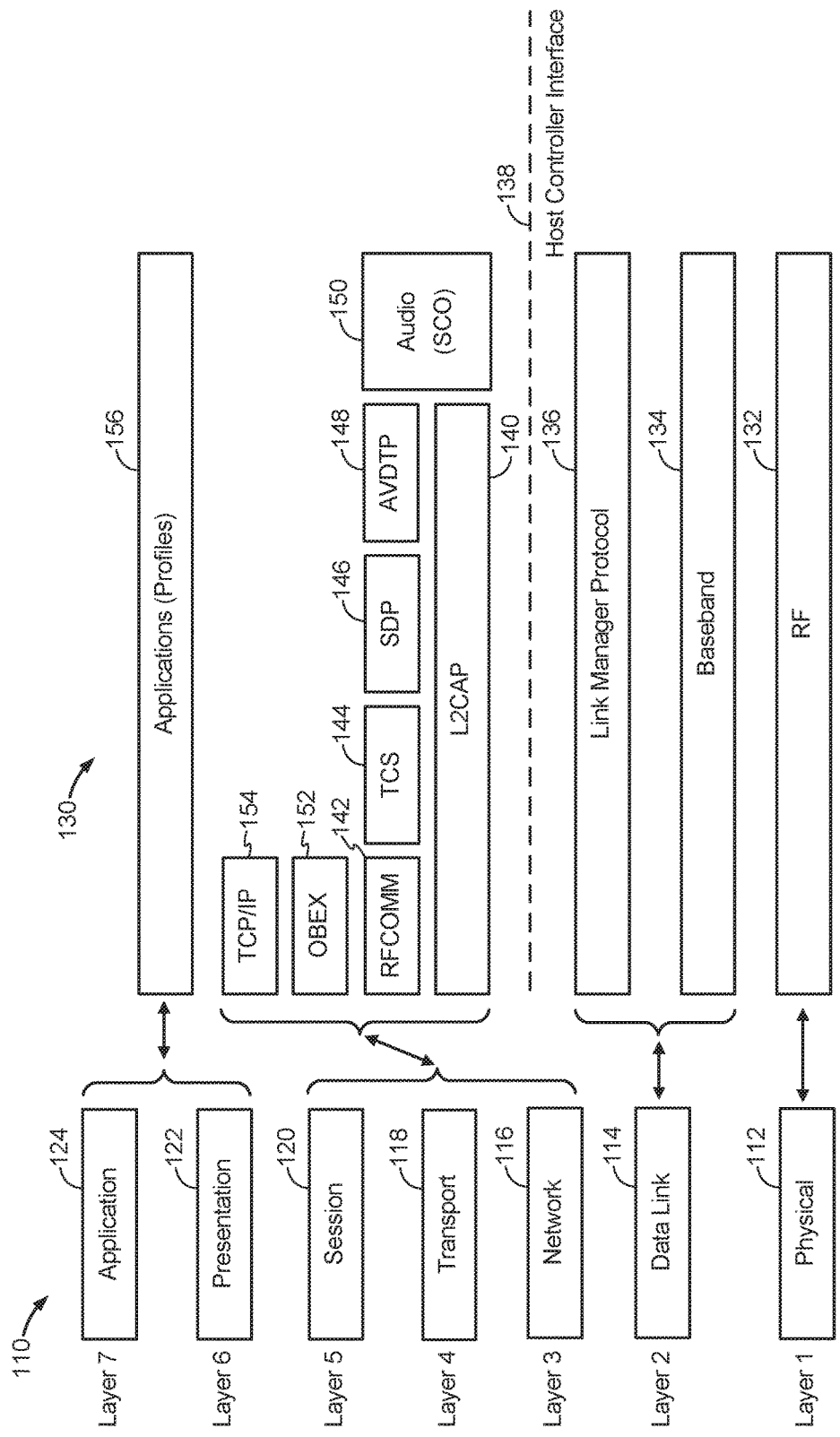
FIG. 1 illustrates a relationship between the Bluetooth protocol stack and the Open Systems Interconnect (OSI) seven-layer model, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "isochronous data" or variants thereof may generally refer to data that is time-bounded, time-limited, or otherwise time-related such that each information entity is bound to previous and successive entries according to a time relationship. For example, in various embodiments, isochronous data may refer to time-dependent audio (e.g., television audio that needs to be synchronized in time with respect to the related moving images). However, those skilled in the art will appreciate that isochronous data as described herein is also contemplated to include any suitable time-bounded data used in non-audio applications (e.g., subtitles or closed captioning that also needs to be synchronized in time with respect to the television audio and video). Accordingly, as will be described in further detail herein, the term "isochronous channel" and variants thereof may refer to a logical transport used to transfer encrypted or unencrypted isochronous data from a transmitting device to one or more receiving devices, while the term "isochronous stream" and variants thereof may refer to a logical link that can carry one or more time-related isochronous channels.

According to various aspects, FIG. 1 illustrates a relationship between the Bluetooth protocol stack 130 and the seven layers in the Open Systems Interconnect (OSI) model 110, which was established to standardize information transmission between points over the Internet or other wired and/or wireless networks. In particular, the OSI model 110 generally separates communications processes between two points in a network into seven stacked layers, with each layer adding certain functions. Each device handles a message such that a downward flow through each layer occurs at a sending endpoint and an upward flow through the layers occurs at a receiving endpoint. The programming and/or hardware that provides the seven layers in the OSI model 110 is typically a combination of device operating systems, application software, TCP/IP and/or other transport and network protocols, and other software and hardware.

More particularly, referring to FIG. 1, the OSI model 110 includes a physical layer 112 (OSI Layer 1) used to convey a bit stream through a network at a physical level. The Institute of Electrical and Electronics Engineers (IEEE) sub-divides the physical layer 112 into the PLCP (Physical Layer Convergence Procedure) sub-layer and the PMD (Physical Medium Dependent) sub-layer. The data link layer 114 (OSI Layer 2) provides physical level synchronization, performs bit-stuffing, and furnishes transmission protocol knowledge and management, etc. The IEEE sub-divides the data link layer 114 into two further sub-layers, which comprise the Media Access Control (MAC) sub-layer to control data transfer to and from the physical layer and the Logical Link Control (LLC) sub-layer to interface with the network layer 116 (OSI Layer 3), interpret commands, and perform error recovery.

According to various aspects, still referring to FIG. 1, the network layer 116 (OSI Layer 3) handles data transfer across a network (e.g., routing and forwarding) in a manner independent from any media and specific network topology, the transport layer 118 (OSI Layer 4) manages end-to-end control and error-checking to multiplex data transfer across the network according to application-level reliability requirements, and the session layer 120 (OSI Layer 5) establishes, coordinates, and terminates conversations, exchanges, and dialogs between the applications to provide management and data flow control services.

According to various aspects, still referring to FIG. 1, the presentation layer 122 (OSI Layer 6) converts incoming and outgoing data from one presentation format to another, which may comprise adding service structure to the data units to provide data to the application layer 124 (OSI Layer 7) according to a common representation, while the application layer 124 is where communication partners are identified, quality of service (QoS) is identified, user authentication and privacy are considered, constraints on data syntax are identified, and any other functions relevant to managing communications between host applications are managed.

Turning now to the Bluetooth protocol stack 130, the radio frequency (RF) layer 132 generally corresponds to the physical layer 112 in the OSI model 110, the baseband layer 134 and the link manager protocol layer 136 generally correspond to the data link layer 114, and a Host Controller Interface (HCI) 138 separates the RF layer 132, the baseband layer 134, and the link manager protocol layer 136 from the upper layers. For example, the Physical Layer 112 in the OSI model 110 manages electrical interfaces to communications media, which includes modulation and channel coding, and therefore covers the Bluetooth radio in the RF layer 132 (and possibly part of the baseband layer 134), while the data link layer 114 manages transmission, framing, and error control over a particular link, which overlaps tasks performed in the link manager protocol layer 136 and the control end of the baseband layer 134 (e.g., error checking and correction).

Above the HCI 138, the Logical Link Control and Adaptation Protocol (L2CAP) 140, RF communication (RF-COMM) channel 142, Telephony Control Specification (TCS) 144, Service Discovery Protocol (SDP) 146, Audio/Video Distribution Transport Protocol (AVDTP) 148, Synchronous Connection Oriented (SCO) Audio 150, object exchange (OBEX) 152, and TCP/IP 154 functions correspond to the network layer 116, transport layer 118, and session layer 120. The applications layer 156 comprises the Bluetooth profiles (e.g., the Handsfree Profile (HFP) for voice, the Advanced Audio Distribution Profile (A2DP) for high-quality audio streaming, the Video Distribution Profile (VDP) for video streaming, etc.) and corresponds to the presentation layer 122 and the application layer 124 in the OSI model 110. Accordingly, a Bluetooth profile may generally be considered synonymous with an "application" in the OSI seven-layer model 110. In relation to the Bluetooth HFP, the RFCOMM channel 142 comprises a communication channel named "service level connection" ("SLC") (not shown) that emulates a serial port used for further communication between an Audio Gateway (AG) device and a Handsfree (HF) device. For voice audio connections, such as in the Bluetooth HFP, a separate baseband link called a synchronous connection-oriented (SCO) channel carries the voice data, represented as SCO audio 150 in FIG. 1. For A2DP, the audio data (unidirectional high-quality audio content, which may be in mono or stereo) goes over AVDTP 148, which in turn goes over L2CAP 140. At the radio level, all L2CAP 140 data flows over a logical link, as will be described in further detail below with reference to FIG. 4.

According to various aspects, Bluetooth wireless technology systems generally come in two forms, which include Basic Rate (BR) and Low Energy (LE), wherein the former further includes optional Enhanced Data Rate (EDR) Alternate Media Access Control (MAC) and Physical (PHY) layer extensions. Bluetooth BR systems and Bluetooth LE systems both include device discovery, connection establishment, and connection mechanisms. However, the Bluetooth LE system includes features designed to enable products that require lower current consumption, lower complexity, and lower cost than BR/EDR and has a design to support use cases and applications with lower data rates and lower duty cycles. In general, depending on the use case or application, one system including any optional parts may be more optimal than the other. Furthermore, devices implementing both systems can communicate with other devices implementing both systems as well as devices implementing either system. However, some profiles and use cases may only be supported in one system or the other, whereby devices that implement both systems have the ability to support the most use cases. With reference, to FIG. 1, the Bluetooth core system generally comprises a host and one or more controllers, wherein a host is a logical entity defined as all of the layers below the applications layer 156 in which the Bluetooth profiles are implemented and above the HCI 138, while a controller is a logical entity defined as all of the layers below the HCI 138. According to various aspects, a Bluetooth enabled device generally has one primary controller, which may be a BR/EDR controller that includes the RF layer 132, the baseband layer 134, the link manager protocol layer 136, and optionally the HCI 138. Alternatively, the primary controller may be a Low Energy (LE) controller that includes the LE PHY, link manager protocol layer 136, and optionally the HCI 138. In a further alternative, the primary controller may combine a BR/EDR portion and a LE controller portion into a single controller, in which case the controller configuration has only one Bluetooth device address shared among the combined BR/EDR and LE controller portions.

Figure 2:
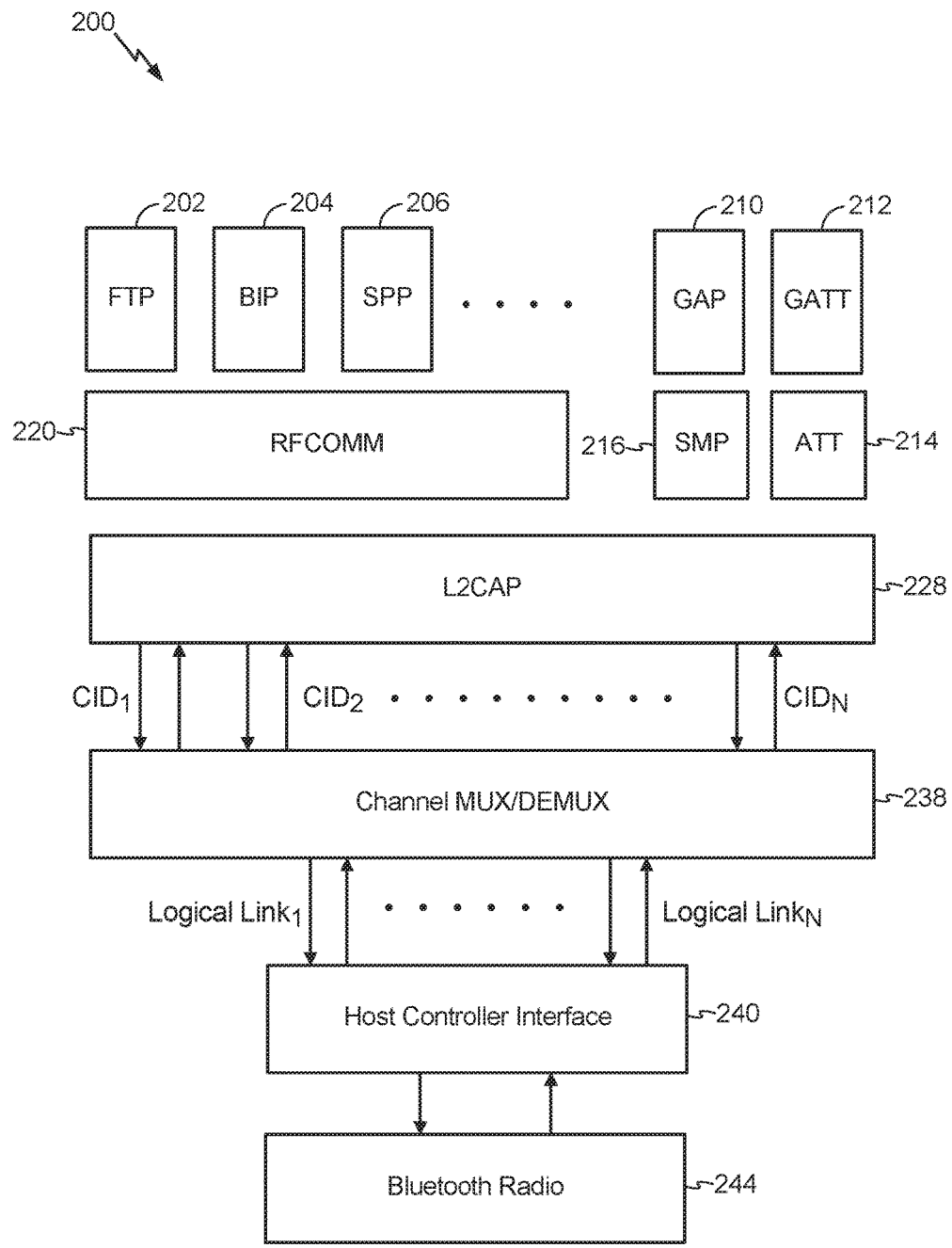
FIG. 2 illustrates an implementation using the Bluetooth protocol stack to support one or more logical connections, according to various aspects.

According to various aspects, FIG. 2 illustrates an implementation using the Bluetooth protocol stack 200 to support one or more logical connections. For example, the File Transfer Protocol (FTP) 202 provides a method to transfer files without the loss of data, which can include all file types including binary and ASCII text, the Basic Imaging Profile (BIP) 204 establishes the fundamental requirements to enable negotiation of the size and encoding of image-related data, the Serial Port Profile (SPP) 206 defines how to set up virtual serial ports and connect two Bluetooth-enabled devices, and the RFCOMM 220 is a protocol based upon the standard for serial port emulation which has been adopted for Bluetooth. Furthermore, as mentioned above, the Bluetooth protocol stack 200 includes an L2CAP layer 228, which provides multiplexing (MUX) and demultiplexing (DEMUX) capabilities in the Bluetooth protocol stack 200. For example, the L2CAP layer 228 may establish a Channel ID (CID) link to a MUX/DEMUX sublayer 238, wherein a CID refers to a logical connection on the L2CAP layer 228 between two devices serving a single application or higher layer protocol. The MUX/DEMUX sublayer 238 may operate over a logical link that the baseband layer protocols provide. The Host Controller Interface (HCI) 240, upon receipt of data over a logical link, communicates the lower layer protocols to the host device (e.g., a Bluetooth-enabled laptop or mobile phone). The HCI 240 therefore represents the command interface to the baseband controller and provides uniform access to the baseband capabilities controlling the Bluetooth radio 244.

According to various aspects, in Bluetooth BR/EDR and Bluetooth LE implementations, the Bluetooth radio 244 operates in the unlicensed 2.4 GHz ISM band. In Bluetooth LE implementations, a frequency hopping transceiver is employed to combat interference and fading and provides many Frequency Hopping Spread Spectrum (FHSS) carriers. In Bluetooth LE, frequency division multiple access (FDMA) and/or time division multiple access (TDMA) schemes may be employed and the physical channel is sub-divided into time units (or "events") in which packets may be positioned to transmit data between Bluetooth LE devices. In general, there are two events types, which include advertising and connection events. Devices that transmit the advertising packets on the advertising PHY channels are referred to as advertisers and devices that receive advertising on the advertising channels without the intention to connect to the advertising device are referred to as scanners. Transmissions on the advertising PHY channels occur in advertising events, wherein at the start of each advertising event, the advertiser sends an advertising packet corresponding to the advertising event type. Depending on the advertising packet type, the scanner may make a request to the advertiser on the same advertising PHY channel and a response from the advertiser on the same advertising PHY channel may follow the request. Above the physical channel, links, channels, and associated control protocols are arranged in a hierarchy based on a physical channel, a physical link, a logical transport, a logical link, and an L2CAP channel, as will be described in further detail below with respect to FIG. 4.

Referring to FIG. 2, in Bluetooth BR/EDR and Bluetooth LE implementations, the L2CAP layer 228 provides a channel-based abstraction to applications and services, wherein the L2CAP layer 228 fragments and de-fragments application data and multiplexes/de-multiplexes multiple channels over a shared logical link. However, in a Bluetooth LE implementation, two additional protocol layers that reside above the L2CAP layer 228 are provided. In particular, as shown in FIG. 2, the Security Manager protocol (SMP) 216 uses a fixed L2CAP channel to implement security functions between devices and the Attribute protocol (ATT) 214 provides a method to communicate small amounts of data over a fixed L2CAP channel. Devices also use the ATT protocol 214 to determine the services and capabilities associated with other devices. The ATT protocol 214 further depends on the Generic Access Profile (GAP) 210, which provides the basis for all other profiles and defines how two Bluetooth-enabled devices discover and establish a connection with each other. The Generic Attribute (GATT) Profile 212 is built on the ATT protocol 214 and defines a service framework to use the ATT protocol 214 according to procedures, formats, and characteristics associated with certain services (e.g., discovering, reading, writing, notifying, and indicating characteristics, configuring broadcast characteristics, etc.). In general, the GAP 210, the GATT profile 212, and the ATT protocol 214 are not transport-specific and can be used in Bluetooth BR/EDR and Bluetooth LE implementations. However, Bluetooth LE implementations are required to implement the GATT profile 212 and the ATT protocol 214 because the GATT profile 212 is used to discover services in Bluetooth LE.

Figure 3:
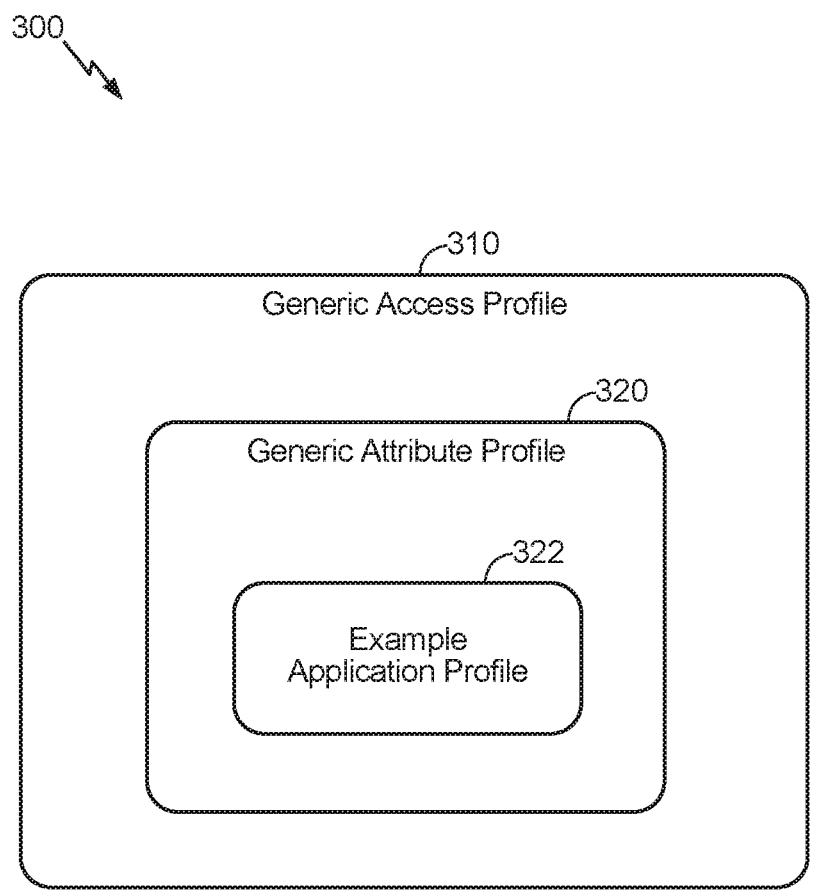
FIG. 3 illustrates dependency relationships associated with the Generic Attribute (GATT) Profile on which Bluetooth Low Energy (LE) application profiles are based, according to various aspects.

According to various aspects, FIG. 3 illustrates dependency relationships 300 associated with the Generic Attribute (GATT) Profile 320 on which all application profiles 322 are based in Bluetooth LE. More particularly, a first profile may generally be considered dependent upon a second profile where the first profile re-uses part of the second profile, which may occur where the first profile implicitly or explicitly references the part of the second profile re-used in the first profile. Accordingly, a profile has dependencies on the profile(s) that contain the profile, whether directly or indirectly. For example, as shown in FIG. 3, the GATT profile 320 depends on the Generic Access Profile (GAP) 310, which defines how two Bluetooth units discover and establish a connection with one another to provide the basis for all other Bluetooth profiles. The GATT profile 320 is designed to be used by an application profile 322 such that a client can communicate with a server, wherein the client refers to a role associated with a device that initiates commands and requests towards the server and can receive responses, indications, and notifications sent from the server, while the server refers to a role associated with the device that accepts incoming commands and requests from the client and sends responses, indications, and notifications to the client. However, those skilled in the art will appreciate that the client and server roles are not fixed to the device, as the roles are instead determined when a device initiates a defined procedure and are released when the procedure ends. Accordingly, the device operating in the server role contains various attributes, and the GATT profile 320 defines how to use the Attribute (ATT) Protocol to discover, read, write and obtain indications associated with the attributes and to configure broadcasting attributes. With respect to Bluetooth LE, the Bluetooth Special Interest Group (SIG) has defined several example application profiles 322 that are based on the GATT profile 320 and used to send and receive data (or attributes) over a low-energy link. For example, some application profiles 322 that are based on the GATT profile 320 include the Blood Pressure Profile (BLP) to enable a device to connect and interact with a Blood Pressure Sensor device in consumer and professional healthcare applications, the Find Me Profile (FMP) that defines behavior when a button is pressed on one device to cause an alerting signal on a peer device, the Link Loss Service (LLS) to define behavior when a link is lost between devices, and the Proximity Profile (PXP) to enable proximity monitoring between devices, among others.

Figure 4:
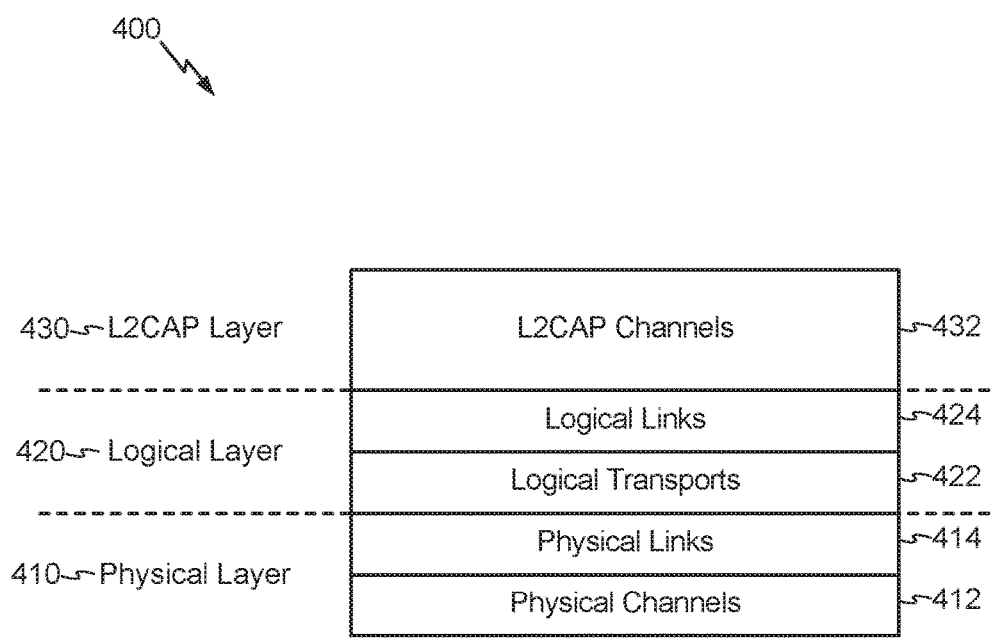
FIG. 4 illustrates a Bluetooth generic data transport architecture that can be used in connection with the various aspects and embodiments described herein.

According to various aspects, FIG. 4 illustrates a Bluetooth generic data transport architecture 400 that can be used in connection with the various aspects and embodiments described herein. In particular, the Bluetooth generic data transport architecture 400 shown in FIG. 4 is divided into various layers, which include a physical layer 410, a logical layer 420, and an L2CAP layer 430. For efficiency and legacy reasons, the Bluetooth generic data transport architecture 400 sub-divides the logical layer 420, distinguishing between logical transports 422 and logical links 424, which provides a general and commonly understood concept whereby a logical link provides an independent transport between two or more devices. The logical transport sub-layer 422 may describe inter-dependences between logical links 424 having different types.

According to various aspects, the lowest layer in the Bluetooth generic data transport architecture 400 is the physical channel 412, wherein all Bluetooth physical channels 412 are characterized according to an RF frequency combined with temporal parameters and restricted according to spatial considerations. For the basic and adapted piconet physical channels 412, frequency hopping is used to change frequency periodically to reduce the effects from interference and to comply with regulatory requirements. In general, two Bluetooth-enabled devices that together implement a particular use case employ a shared physical channel 412 to communicate. Accordingly, the two Bluetooth-enabled devices may need to tune respective transceivers to the same RF frequency at the same time and be within a nominal range from one other. A Bluetooth device is said to be "connected" to a physical channel 412 whenever the Bluetooth device is synchronized to the timing, frequency, and access code associated with the physical channel 412 (whether or not the device is actively involved in communications over the physical channel 412). Although the Bluetooth specification assumes that a device is only capable of connecting to one physical channel 412 at any time, advanced devices may have capabilities to simultaneously connect to more than one physical channel 412.

In Bluetooth LE implementations, two Bluetooth LE devices use a shared physical channel 412 to communicate, whereby the two Bluetooth LE devices may tune respective transceivers to the same physical frequency at the same time and be within a nominal range from one another. However, because physical channels 412 are limited in number and many Bluetooth devices can be operating independently within the same spatial and temporal area, there may be two independent device pairs with transceivers tuned to the same physical channel 412, resulting in a collision. As such, whereas Bluetooth BR/EDR implementations use an access code to identify the piconet, Bluetooth LE implementations use a randomly generated Access Address to identify a physical link 414. In the event that two devices happen to share the same physical channel 412 in the same area, the targeted device Access Address may be used to determine to which device the communication is directed. Up to the Bluetooth 4.2 specification, there are two physical channels 412 defined for Bluetooth LE, which include the LE piconet physical channel 412 that connected devices use to communicate over a specific piconet and the LE advertisement broadcast channel 412 that may be used to broadcast advertisements. In general, a Bluetooth LE device can only use one LE physical channel 412 at any given time, although multiple concurrent operations can be supported using time-division multiplexing between the physical channels 412.

Above the physical channels sub-layer 412, the physical links sub-layer 414 represents a baseband connection between Bluetooth-enabled devices. In general, a physical link 414 is associated with one physical channel 412, although a physical channel 412 may support more than one physical link 414, which is a virtual concept that has no direct representation within a transmitted packet structure. The access code packet field, together with the clock and address associated with the master Bluetooth device, are used to identify a physical channel 412. However, the packet does not include a subsequent part that directly identifies the physical link 414. Instead, the physical link 414 may be identified through an association with a logical transport 422, as each logical transport 422 is only received on one physical link 414. In situations where a transmission is broadcast over more than one physical link 414, the transmission parameters are generally selected to be suitable for all physical links 414.

With respect to Bluetooth LE, the LE piconet physical channels 412 support an LE active physical link 414, which refers to a point-to-point link between a master and a slave that is always present when the slave is in a connection with the master. The physical link 414 between a master and a slave device is active if a default LE ACL logical transport exists between the devices, wherein active physical links 414 are identified according to the randomly generated Access Address used in the Link Layer packet. Each Access Address has a one-to-one relationship with the master and the slave of the active physical link 414. The LE advertising physical channels 412 support an LE advertising physical link 414, which refers to a broadcast between the advertiser device and one or more scanner or initiator devices and is always present when the advertiser is broadcasting advertisement events. An advertising physical link 414 between an advertising device and an initiating device for forming a connection (e.g., an active physical link 414) can exist for a relatively short time.

According to various aspects, within the logical layer 420, various logical links 424 are available to support different application data transport requirements. Each logical link 424 is associated with a logical transport 422 that has various characteristics (e.g., flow control, acknowledgement/repeat mechanisms, sequence numbering, scheduling behavior, etc.). In general, logical transports 422 can carry logical links 424 having different types, depending on the type associated with the logical transport 422. In various use cases, logical links 424 can be multiplexed onto the same logical transport 422, which may be carried on active physical links 414 on either a basic or an adapted piconet physical channel 412. Information to identify the logical transport 422 and provide real-time (link control) signaling is carried in a packet header and for certain logical links 424, the identification may be carried in a payload header, while control signaling that does not require single slot response times is carried out using the LMP protocol. Certain logical transports 422 can support different logical links 424, either concurrently, multiplexed, or one at a time. Within such logical transports 422, the logical link 424 is identified according to one or more logical link identifier (LLID) bits in the payload header associated with baseband packets that carry a data payload. The logical links 424 distinguish between limited core protocols that can transmit and receive data on the logical transports 422. However, some logical transports 422 cannot carry all logical links 424. For example, the SCO and Extended SCO (eSCO) logical transports 422 can only carry constant data rate streams.

According to various aspects, the L2CAP layer 430 provides a multiplexing role allowing different applications to share the resources of a logical link 424 between two devices. Applications and service protocols interface with the L2CAP layer 430 using a channel-oriented interface to create connections to equivalent entities on other devices. In general, L2CAP channel endpoints are identified to their clients according to a channel identifier (CID) that L2CAP assigns, wherein each L2CAP channel endpoint on any device has a different CID. At the L2CAP layer 430, L2CAP channels 432 may be configured to provide an appropriate quality of service (QoS) to the application, wherein the L2CAP layer 430 maps the L2CAP channel 432 onto the underlying logical link 424. The L2CAP layer 430 may support channels that are connection-oriented and others that are group-oriented. Apart from creating, configuring, and terminating channels, the L2CAP layer 430 provides a role to multiplex service data units (SDUs) from the channel clients onto the logical links 424 and to carry out scheduling in which SDUs are selected according to relative priority.

According to various aspects, referring again to the logical layer 420 and the physical layer 410, the following table lists various Bluetooth BR/EDR logical transports 422 that are supported up to the Bluetooth 4.2 specification as well as the logical links 424 that such logical transports 422 support, the physical links 414 and the physical channels 412 that can support the logical transports 422, and a brief description associated with each logical transport 422.

TABLE 1

Supported Bluetooth BR/EDR Logical Transports

| Logical Transport | Logical Link Support | Physical Link Support | Overview |
|---|---|---|---|
| Asynchronous Connection-Oriented (ACL) | Control (LMP) ACL-C User (L2CAP) ACL-U | Active physical link, basic or adapted physical channel. | Reliable or time-bounded, bi-directional, point-to-point. |
| Synchronous Connection-Oriented (SCO) | Stream (unframed) SCO-S | Active physical link, basic or adapted physical channel. | Bi-directional, symmetric, point-to-point, AV channels. Used for 64 Kb/s constant rate data. |
| Extended Synchronous Connection-Oriented (eSCO) | Stream (unframed) eSCO-S | Active physical link, basic or adapted physical channel. | Bi-directional, symmetric or asymmetric, point-to-point, general regular data, limited retransmission. Used for constant rate data synchronized to the master Bluetooth clock. |
| Active slave broadcast (ASB) | User (L2CAP) ASB-U | Active physical link, basic or adapted physical channel. | Unreliable, uni-directional broadcast to any devices synchronized with the physical channel. Used for broadcast L2CAP groups. |
| Parked slave broadcast (PSB) | Control (LMP) PSB-C, User (L2CAP) PSB-U | Parked physical link, basic or adapted physical channel. | Unreliable, uni-directional broadcast to all piconet devices. Used for LMP and L2CAP traffic to parked devices, and for access requests from parked devices. |

According to various aspects, referring again to the logical layer 420 and the physical layer 410, the following table lists various Bluetooth LE logical transports 422 supported up to the Bluetooth 4.2 specification as well as the logical links 424 that such logical transports 422 support, the physical links 414 and the physical channels 412 that can support the logical transports 422, and a brief description associated with each.

TABLE 2

Supported Bluetooth LE Logical Transports

| Logical Transport | Logical Link Support | Physical Link Support | Overview |
|---|---|---|---|
| LE Asynchronous Connection (LE-ACL) | Control (LL) LE-C, User (L2CAP) LE-U | LE Active physical link, LE piconet physical channel. | Reliable or time-bounded, bi-directional, point-to-point. |
| LE Advertising Broadcast (ADVB) | Control (LL) ADVB-C, User (LL) ADVB-U | LE Advertising physical link, LE piconet physical channel. | Unreliable due to lack of acknowledgement, packets transmitted a number of times over LE advertising broadcast link to improve reliability |

Notably, the Bluetooth generic data transport architecture 400 that have been defined up to the Bluetooth 4.2 specification do not include any specific support in Bluetooth LE that can be used to transfer isochronous data (e.g., time-bounded data that has a limited lifetime after which the data becomes invalid). Rather, in the Bluetooth 4.2 specification, Bluetooth BR/EDR implementations can only support time-bounded data through configuring an ACL link to automatically flush packets that have expired. Accordingly, the Bluetooth SIG has proposed features to support isochronous (time-bounded) data, which may refer to information in a stream where each information entity is bound to previous and successive entries according to a time relationship. In general, isochronous data may be used in many applications, including audio as well as time-limited data conveyed in a mesh network (e.g., a television broadcasting audio to one or more users, a music player transmitting personal audio, a public announcement system broadcasting audio within an airport, etc.).

More particularly, according to various aspects, isochronous data support may be enabled in Bluetooth LE via isochronous physical channels 412 used to transfer isochronous data from a source device to one or more sink devices according to a connection-oriented or connectionless method. For example, in various embodiments, the isochronous physical channels 412 may be characterized according to a pseudo-random hopping sequence among a set of physical (PHY) data channels (with any packet retransmission(s) done on a different PHY channel), a channel map parameter that indicates the set of PHY channels, a channel selection algorithm used to select the PHY channels, and one or more timing parameters to indicate the first isochronous data packet sent in either a Link Layer connection command or an advertising packet. Furthermore, as noted above, the isochronous physical channels 412 may enable isochronous data to be transferred via a connection-oriented configuration (i.e., a one-to-one configuration in which a source device transfers isochronous data to one sink device) or according to connectionless configuration (i.e., a one-to-many configuration in which the source device broadcasts the isochronous data to one or more sink devices).

More particularly, in various embodiments, the isochronous physical channels 412 may support an isochronous physical link 414, which may carry isochronous logical transports 422. For example, as mentioned above, the isochronous logical transport 422 may be connection-oriented, in which case the isochronous physical link 414 may be a point-to-point link between one source device and one sink device. The isochronous physical link 414 used to carry the connection-oriented isochronous logical transport 422 may be identified according to a randomly generated access address used in a Link Layer packet and handle associated with an isochronous connection-oriented (ICO) channel. The ICO channel may therefore provide the isochronous connection-oriented logical transport 422 that can be used to transfer isochronous data between two connected devices (e.g., a phone transferring audio data to and from a wireless headset). After the two devices are connected (i.e., an ACL connection exists), the source device may set up an isochronous logical link 424 with the source device, wherein the isochronous logical link 424 may be defined as an Isochronous Connection-Oriented (ICO) stream that can carry one or more time-related ICO channels. A particular source device may set up ICO streams that each carry one or more time-related ICO channels with one or more source devices in a piconet. An ICO channel may include one or more events that may in turn include one or more sub-events used to transfer packets that include isochronous data between the source device and the sink device(s).

Alternatively and/or additionally, the isochronous logical transport 422 may be an isochronous connectionless (ICL) channel, in which case the isochronous physical link 414 may be a broadcast between a source device and one or more sink devices (e.g., a television broadcasting audio data to one or many users). For example, in various embodiments, the source device may set up an Isochronous Connectionless (ICL) stream, which may provide an isochronous logical link 424 that can carry one or more time-related ICL channels. Furthermore, as with an ICO channel, the one or more ICL channels making up an ICL stream may each include one or more events, which may likewise include one or more sub-events used to transfer data packets related to the ICL stream. In various embodiments, as will be discussed in further detail below, the source device may broadcast synchronization information associated with the ICL stream in one or more advertising and/or synchronization packets. Accordingly, the isochronous physical link 414 used to carry the isochronous connectionless logical transport 422 may be identified according to an offset associated with the ICL stream, which may be indicated in the one or more advertising and/or synchronization packets. As such, in order to receive the isochronous data broadcasted via one or more ICL channels, a sink device first receives the synchronization information broadcasted via the one or more advertising and/or synchronization packets and then synchronize to the frequency hopping sub-events in the one or more ICL channels. Furthermore, the ICL stream may include an update sub-event that provides a mechanism to allow the source device to provide updated control information to all the sink devices (e.g., a new channel map). As such, the logical transports 422 used to support the ICL logical link 424 may further include an ICL control channel, which may use the isochronous physical link 414 and the update sub-event to broadcast updated control information.

In general, the decision to use an ICO channel or an ICL channel may depend on the use case, which the application profile in the device defines. For example, various reasons to use an ICO channel or an ICL channel are listed in the following table:

TABLE 3

| Comparison Between ICO Channels and ICL Channels | |
|---|---|
| ICO Channels | ICL Channels |
| Point to point (connection based use case) | Point to multipoint (broadcast use case) |
| Unidirectional or bidirectional | Unidirectional only |
| Retransmission based on ACK/NACK | Unconditional retransmission |
| Secure | Encrypted or unencrypted |

Accordingly, isochronous data support may be extended to Bluetooth LE logical via the isochronous physical channel(s) 412, the isochronous physical link(s) 414, the isochronous logical transport(s) 422, and the isochronous logical link(s) 424 as follows:

TABLE 4

| Bluetooth LE Isochronous Transports | | | |
|---|---|---|---|
| Logical Transport | Logical Link(s) Support | Physical Link Support | Overview |
| ICO and ICL Data Channels | Low Energy-Stream (LE-S) | LE isochronous physical link | Unidirectional or bidirectional channels to transfer isochronous data in a point-to-point connection; also supports unidirectional |

TABLE 4-continued

Bluetooth LE Isochronous Transports

| Logical Transport | Logical Link(s) Support | Physical Link Support | Overview |
|---|---|---|---|
| | | | channels to transfer isochronous data in point-to-multipoint connections |
| ICL Control Channel | Low Energy Broadcast Control (LEB-C) | LE isochronous physical link (using the update sub-event) | Unidirectional channels to control broadcasted isochronous data |

Figure 5:
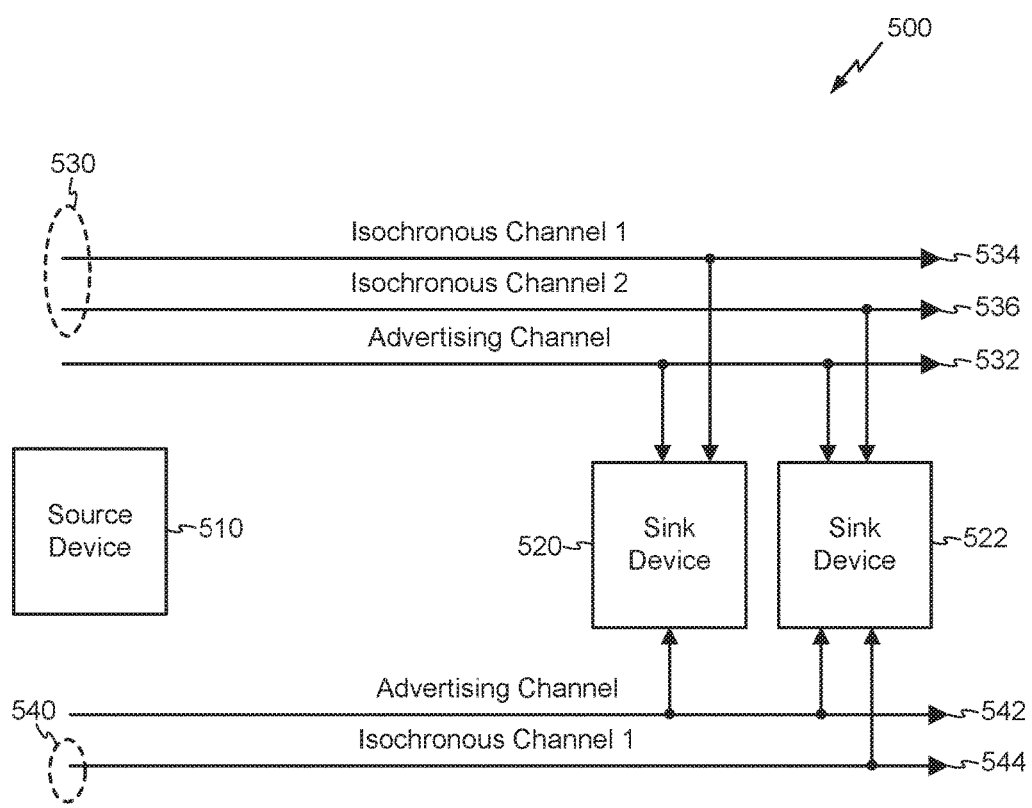
FIG. 5 illustrates an exemplary use case in which a source device transmits one or more isochronous streams to one or more sink devices, according to various aspects.

According to various aspects, as shown in FIG. 5, an example use case 500 in which a source device 510 transfers isochronous data to multiple sink devices 520, 522 according to a connectionless method will now be described for illustration purposes. In the example use case 500 shown in FIG. 5, the source device 510 broadcasts the isochronous data via two separate isochronous streams, which include a first isochronous stream 530 that carries time-related isochronous channels 534, 536 as well as a second isochronous stream 540 that carries one isochronous channel 544. The source device 510 further broadcasts synchronization information associated with the first isochronous stream 530 via a first advertising channel 532 and synchronization information associated with the second isochronous stream 540 via a first advertising channel 542. Accordingly, to receive the isochronous data from the source device 510, the sink devices 520, 522 first receive the synchronization information via the advertising channels 532, 542 and then synchronize to the frequency hopping sub-events in any isochronous channel(s) 534, 536, 544 selected at the sink devices 520, 522. For example, the isochronous streams 530, 540 may each be allocated a respective stream identifier and each isochronous channel 534, 536, 544 may be allocated a respective channel identifier. The stream identifier and the channel identifier may be transmitted in the synchronization information conveyed via the advertising channels 532, 542 such that each sink device 520, 522 may select and acquire appropriate isochronous channels. For example, in FIG. 5, one sink device 520 has selected the first isochronous channel 534 within the first isochronous stream 530 and the other sink device 522 has selected the second isochronous channel 536 within the first isochronous stream 530 and the sole isochronous channel 544 within the second isochronous stream 540.

According to various aspects, multiple isochronous streams 530, 540 may therefore exist between the source device 510 and the sink devices 520, 522, which may enable different isochronous data sets that have different latencies and/or timing dependencies to be transferred from the source device 510 to the sink devices 520, 522. The timing information may generally be conveyed to the sink devices 520, 522 via a control channel. For example, in a connection-oriented use case, the control information may be conveyed using the associated ACL connection between the two connected devices. On the other hand, in a connectionless use case (e.g., as shown in FIG. 5), the timing information may be conveyed via the advertising channels 532, 542 that provide the necessary synchronization information to allow the sink devices 520, 522 to acquire the isochronous channel (s) 534, 536, 544, etc. Furthermore, in various embodiments, the connectionless isochronous streams 530, 540 may include an update sub-event to allow the source device 510 to provide updated control information (e.g., a new channel map) to all the sink devices 520, 522. In general, the source device 510 may schedule the update sub-event within the isochronous streams 530, 540 when the updated control information needs to be sent to the sink devices 520, 522. For example, to schedule the update sub-event within the isochronous stream 530, the source device 510 may set an update transmission flag within a packet transmitted via the associated isochronous channels 534, 536. As such, the sink device 520 may check the update transmission flag in the data packet received via the first isochronous channel 534 selected thereby and the other sink device 522 may similarly check the update transmission flag in the data packet received via the second isochronous channel 536. In that sense, each sink device 520, 522 may schedule and receive the update sub-event from the source device 510.

According to various aspects, in some cases, the isochronous data to be transmitted via one or more isochronous channels 534, 536, 544, etc. may start and stop from time to time depending on the isochronous data available to broadcast (e.g., the isochronous data may stop when audio is paused and start again when the audio is resumed, announcements in an airport may be made intermittently, etc.). As such, one way to notify the sink devices 520, 522 when the isochronous data starts and stops may be to convey changes in the state associated with the isochronous data via the advertising channels 532, 542. For example, the synchronization information conveyed via the advertising channels 532, 542 may include a data active flag to indicate whether isochronous data is present on a particular isochronous channel 534, 536, 544, etc. In such an implementation, the sink devices 520, 522 would continue to receive the synchronization information conveyed via the advertising channels 532, 542 after the isochronous channels 534, 536, 544, etc. have been acquired such that the sink devices 520, 522 monitor the data active flag to start and stop receiving the isochronous data in the isochronous channels 534, 536, 544, etc. that the respective sink devices 520, 522 have selected. However, conveying the state changes related to the isochronous data via the advertising channels 532, 542 is sub-optimal for several reasons, including that the sink devices 520, 522 may be required to switch between listening to the advertising channels 532, 542 and the isochronous channels 534, 536, 544, etc., which may consume additional resources (e.g., memory and power), increase latency, and/or otherwise interfere with performance.

Figure 6A:
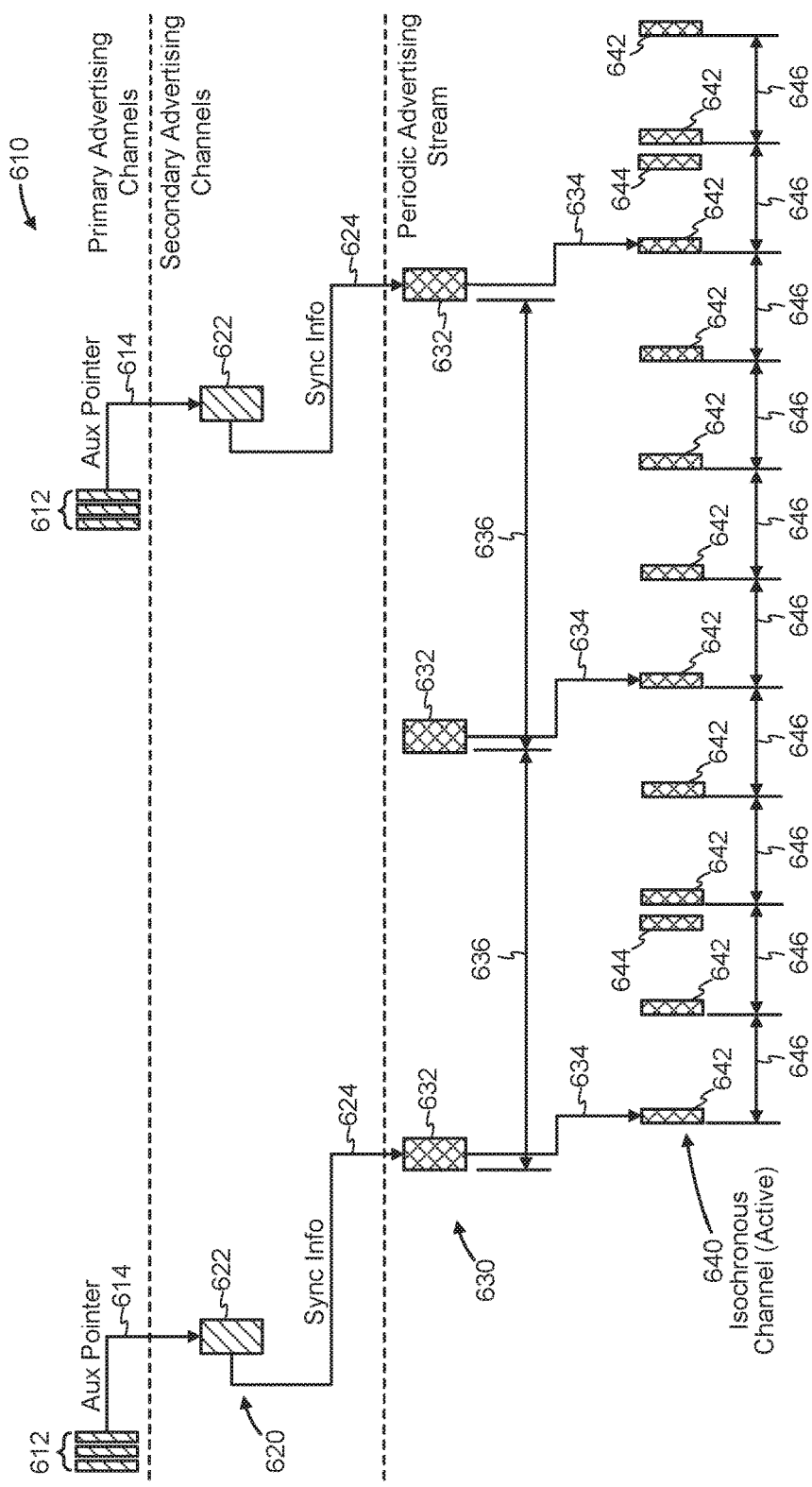
FIG. 6A-6C illustrate exemplary timing diagrams that can use update slots to synchronize to an isochronous channel and communicate state changes associated with the isochronous channel, according to various aspects.
Figure 6B:
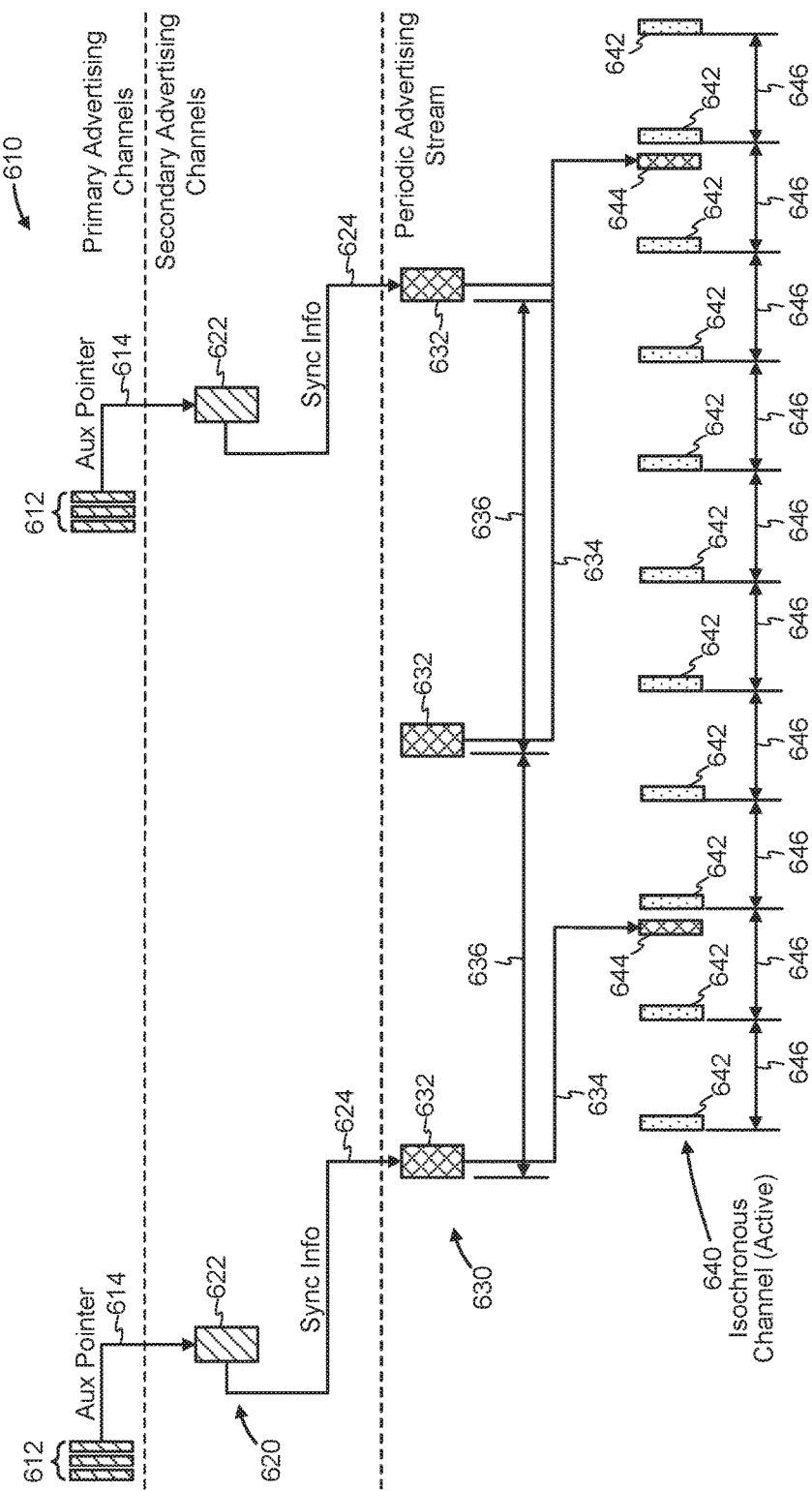
Figure 6C:
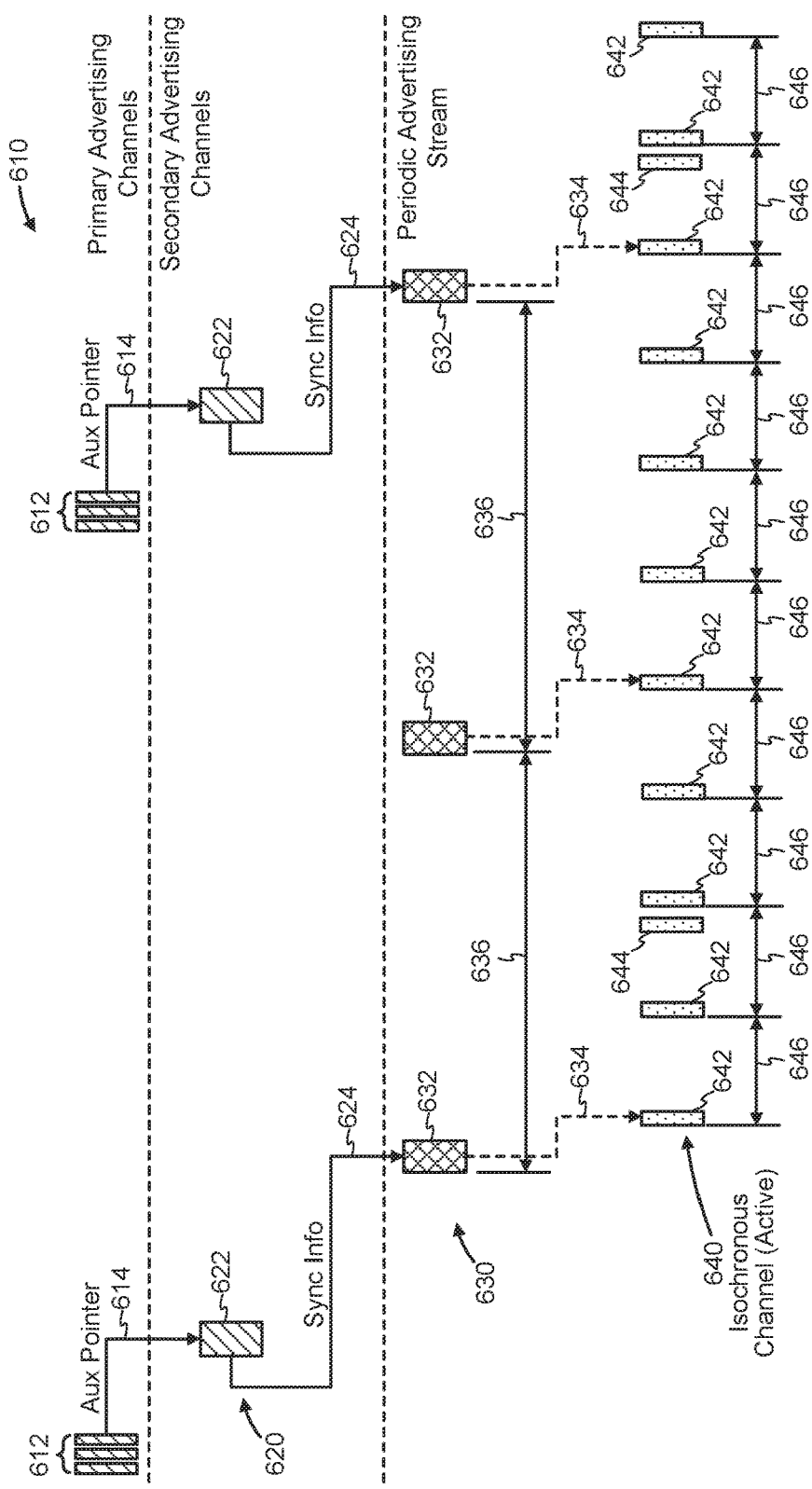

As such, according to various aspects, FIG. 6A to FIG. 6C illustrate exemplary timing diagrams that can use an update slot to synchronize to an isochronous channel according to state information that a source device conveys within the update slot. As such, a sink device that has selected and acquired the isochronous channel may dispense with the requirement to continually listen to a periodic advertising stream used to convey synchronization information related to the isochronous channel after the sink device has acquired (or re-acquired) the isochronous channel. In particular, as mentioned above, an isochronous stream may include an update sub-event that provides a mechanism to allow the source device to update all sink devices receiving the isochronous stream with control information (e.g., a new automatic frequency hopping (AFH) channel map), wherein the source device may schedule the update sub-event within the isochronous stream when the information needs to be sent to sink devices receiving the isochronous stream. Each sink device therefore checks the status associated with the update transmission flag in the data packet received in the isochronous channel to schedule receiving the control packet in the update sub-event. Accordingly, in the following description, the receiving sink devices may directly synchronize to the update sub-event (also called an "update slot") that the source device uses to send occasional control information to the receiving sink devices, whereby any state information relating to the isochronous data transmitted via the isochronous channel (e.g., changes in state from inactive or active, from active to inactive, etc.) may be conveyed via the update sub-event such that the sink devices may cease listening to the periodic advertising stream after the isochronous channel has been acquired.

More particularly, according to various aspects, a source device may transmit one or more advertising packets 612 on one or more primary advertising channels 610 to advertise a data broadcast, wherein the primary advertising channels 610 may comprise one or more physical channels spread across a particular frequency spectrum. The primary advertising channels 610 may be divided into advertising events that can hop on the advertising physical channels. The advertising events may generally occur at regular intervals, which may be subject to a random delay to aid in interference avoidance. Furthermore, one or more secondary advertising channels 620 may be provided to enable an extended advertising event, which may begin at the same time as the advertising event on the primary advertising channels 610 and conclude with the last packet on the secondary advertising channels 620. In general, the secondary advertising channels 620 may be used to offload data that would otherwise be transmitted on the primary advertising channels 610, wherein the source device may schedule auxiliary advertising packets on the secondary advertising channels 620 when sufficient over-the-air time is available. Furthermore, the secondary advertising channels 620 may be used to provide a periodic advertising stream 630, which may be sent on a periodic basis with each packet 632 at a predictable interval 636 from the previous packet 632. In various embodiments, as will be described in further detail herein, occasional advertisement packets 612 on the primary advertising channels 610 together with associated auxiliary advertising packets 622 on the secondary advertising channels 620 may allow the periodic advertisements 632 to be found within the periodic advertising stream 630.

According to various aspects, referring to FIG. 6A, a source device broadcasting isochronous data over an isochronous channel 640 may therefore transmit one or more advertising packets 612 via the primary advertising channels 610, wherein the advertising packets 612 transmitted via the primary advertising channels 610 may include an auxiliary pointer field 614 to point to a subsequent auxiliary advertising packet 622 that contains some or all the advertisement data. For example, the advertising packets 612 transmitted via the primary advertising channels 610 may indicate a Link Layer data channel used to transmit the auxiliary advertising packet 622, approximate timing information between the start of the advertising packet 612 and the subsequent auxiliary advertising packet 622 to which the advertising packet 612 points, and information to identify the physical secondary advertising channel 620 over which the subsequent auxiliary advertising packet 622 will be transmitted. The auxiliary advertising packets 622 on the secondary advertising channels 620 may carry the above-mentioned synchronization information associated with the isochronous channel 640. Furthermore, as depicted at 624, the auxiliary advertising packets 622 may also include information to point to one or more auxiliary synchronization packets 632 transmitted via the periodic advertising stream 630 (e.g., information indicating a time from the start of the auxiliary advertising packet 622 to the start of the subsequent auxiliary synchronization packet 632, a channel index associated with the periodic advertising stream 630, etc.). The auxiliary synchronization packets 632 transmitted via the periodic advertising stream 630 may likewise include the synchronization information associated with the isochronous channel 640. Accordingly, in various embodiments, a sink device seeking to acquire the isochronous channel 640 from the source device may receive the synchronization information via the auxiliary advertising packets 622 broadcasted on the secondary advertising channels 620 and/or the auxiliary synchronization packets 632 transmitted via the periodic advertising stream 630.

More particularly, according to various aspects, the synchronization information broadcasted on the secondary advertising channels 620 and/or the periodic advertising stream 630 may comprise various parameters that enable the isochronous channel 640 to be selected and acquired at the sink device(s), as depicted at 624 and 634. For example, in various embodiments, the synchronization information may include a channel map that indicates used and unused data channels, a symbol rate, a worst case accuracy associated with a sleep clock used at the source device, and/or other suitable physical channel information. In various embodiments, the synchronization information may further include a channel interval, as depicted at 646 in FIG. 6A-6C, which may indicate the time associated with an event on the isochronous channel 640 (i.e., the time for all sub-events including the update sub-event). Furthermore, in various embodiments, the synchronization information may indicate how many isochronous channels are transmitted in the isochronous stream, a channel time offset that indicates a time between isochronous channels, how many sub-events are provided per isochronous channel, a burst number that indicates how many new packets are sent per isochronous channel within a channel interval 646, an initial retransmission number indicating how many sub-events are used to retransmit a packet per isochronous channel within a channel interval 646, a delayed retransmission number to define a delay associated with a packet in isochronous channel intervals, a sub-event offset to indicate a spacing between when sub-events start, and/or other parameters that may enable the sink device(s) to select and acquire the isochronous channel 640 (e.g., a time from an anchor point associated with an auxiliary synchronization packet 632 to a future anchor point, a time from the anchor point to the update sub-event, a packet number associated with the first packet that will be transmitted on the isochronous channel 640, a base address from which all channel access addresses within the isochronous stream are derived, which may also be used as the access address for the control channel in the update sub-event, a cyclic redundancy check (CRC) initialization value, encryption/decryption information if encryption is enabled, etc.).

In various embodiments, the synchronization information conveyed via the auxiliary advertising packets 622 and/or the auxiliary synchronization packets 632 may therefore provide various parameters that may point to the isochronous channel 640 and enable sink devices to synchronize to the frequency hopping sub-events in the isochronous channel 640, which may include one or more isochronous slots 642 in which the source device is scheduled to broadcast isochronous data packets via the isochronous channel 640. In addition, as mentioned above, the isochronous channel 640 may include an update slot 644 in which an update sub-event may be scheduled to allow the source device to provide all sink devices with updated control information related to the isochronous stream, which may include at least the isochronous channel 640. Furthermore, in various use cases, the isochronous stream that includes the isochronous channel 640 may include additional isochronous channels (not shown) that are time-related to the isochronous channel 640. As such, the information conveyed in the update slot 644 may be used to provide updated control information that applies to all the isochronous channels that make up the isochronous stream (i.e., the isochronous channel 640 plus any other isochronous channels within the same isochronous stream). Accordingly, in various embodiments, the source device may be configured to use the update slot 644 to convey state information associated with the isochronous channel 640 in addition to the occasional control information that may otherwise be conveyed within the update slot 644. As such, the unnecessary resource consumption and latency that may occur due to having the receiving sink devices listen to the periodic advertising stream 630 after the isochronous channel 640 has been acquired (or re-acquired) can be avoided via conveying any relevant state information via the update slot 644. The receiving sink device(s) may therefore stop listening to the periodic advertising stream 630 after the isochronous channel 640 has been acquired, as listening to the periodic advertising stream 630 may only be needed to obtain the synchronization information necessary to acquire or reacquire the isochronous channel 640.

In particular, according to various embodiments, each data packet transmitted in the isochronous channel 640 may include at least a header in addition to a variable size payload. The header may generally include a length field to indicate a size associated with the payload in addition to a Logical Link identifier to indicate whether the data packet includes isochronous data transmitted in the one or more isochronous slots 642 or an update sub-event packet transmitted in the update slot 644 (e.g., the Logical Link identifier may be set to a first value such as '00' when the data packet includes isochronous data and to a second value such as '11' when the data packet is an update sub-event packet). Furthermore, in various embodiments, the header may include an update sequence number (USN) that may be set to zero when there is no update sub-event packet scheduled to be transmitted in the update slot 644 and incremented to a new non-zero value each time that a new update sub-event packet is transmitted in the update slot 644. Accordingly, the header may further include an update transmission flag that the source device may enable when an update sub-event packet is scheduled to be transmitted in the update slot 644 (e.g., the update transmission flag may be set to '1' when the update sub-event packet is scheduled in the update slot 644 or to '0' when no update sub-event packet is scheduled in the update slot 644). The source device may therefore set the update transmission flag within one or more data packets that are transmitted in the isochronous slots 642 to indicate that an update sub-event packet is scheduled in the update slot 644.

In various embodiments, the update sub-event packet may include a payload to convey a state associated with the isochronous channel 640 according to a Link Layer control procedure. For example, the payload associated with the update sub-event packet may include an opcode to indicate that the update sub-event packet conveys an isochronous channel state, one or more isochronous channel identifiers, and the isochronous channel state that applies to the isochronous channel(s) associated with such isochronous channel identifier(s), as follows:

TABLE 5

Isochronous Channel State Payload

| Payload | |
|---|---|
| Opcode (one octet) | LL_ICL_STATE_IND |
| CtrData (0-26 octets) | Isochronous Channel Identifier (one octet) |
| | Isochronous Channel State (one octet) |

TABLE 6

Isochronous Channel States

| Isochronous Channel State | Isochronous Data State | Update Sub-Event State |
|---|---|---|
| Active | Present | Present |
| Inactive | Not Present | Present |
| Terminated | Not Present | Not Present |

Accordingly, based on the foregoing description, FIG. 6A illustrates an example timing diagram when the isochronous channel 640 has an active state, meaning that isochronous data (e.g., time-bound audio data) is present in the isochronous slots 642 in which the source device is scheduled to broadcast the isochronous data. In various embodiments, to indicate a transition from the active state (e.g., to an inactive or terminated state), the source device may set the update transmission flag in the data packets transmitted via one or more isochronous slots 642 to schedule an update sub-event packet in a subsequent update slot 644. As such, a sink device that has selected the isochronous channel 640 may monitor the update transmission flag in the data packets that are transmitted via the one or more isochronous slots 642 and schedule reception of the update sub-event packet in the update slot 644 when the update transmission flag is enabled. When the update sub-event packet is received in the update slot 644, each sink device receiving the isochronous channel 640 may detect the state indicator opcode in the update sub-event payload (e.g., "LL_ICL_STATE_IND") and determine the appropriate isochronous channel(s) associated with the isochronous channel state conveyed via the update sub-event packet. For example, based on the payload in the update sub-event packet including a channel identifier that corresponds to the isochronous channel 640, a sink device that has selected or otherwise acquired the isochronous channel 640 may further determine the isochronous channel state applicable thereto. Furthermore, as noted above, the isochronous channel 640 may be used to broadcast isochronous data within an isochronous stream that may (or may not) include one or more additional time-related isochronous channels. As such, in various embodiments, the update sub-event packet may contain a payload that indicates an isochronous channel state associated with multiple channel identifiers that correspond to multiple time-related isochronous channels in the same isochronous stream.

According to various embodiments, FIG. 6A therefore shows the isochronous channel 640 in the active state, wherein data packets that contain isochronous data are present and transmitted in the one or more isochronous slots 642 and the update sub-event packet is present and transmitted in the update slot 644 (when scheduled). Furthermore, as shown in FIG. 6A, the auxiliary synchronization packets 632 that are transmitted via the periodic advertising stream 630 point to the one or more isochronous slots 642 in which the source device is scheduled to broadcast the isochronous data while the isochronous channel 640 is in the active state. Accordingly, to convey a change from the active state to another state, the source device may enable the update transmission flag in a data packet transmitted via one or more isochronous slots 642 in order to schedule the update sub-event packet in the update slot 644. Furthermore, those skilled in the art will appreciate that the update sub-event packet may also be used to convey a current state associated with the isochronous channel 640 such that the state information conveyed via the update sub-event packet is not limited to a state change.

For example, in response to the update sub-event packet transmitted in the update slot 644 conveying a transition from the active state to an inactive state (e.g., when isochronous audio data is paused), the isochronous channel 640 may then follow the timing diagram shown in FIG. 6B. In particular, as shown in FIG. 6B, no data packets are present or otherwise transmitted in the one or more isochronous slots 642 in which the source device would otherwise be scheduled to broadcast the isochronous data via the isochronous channel 640. However, the update sub-event packet may still be present during the inactive state, whereby the sink device(s) can continue to directly synchronize to the isochronous channel 640 while in the inactive state via the state information conveyed in the update slot 644. FIG. 6B further shows that the one or more auxiliary synchronization packets 632 transmitted via the periodic advertising stream 630 point to the update slot 644 when the isochronous channel 640 is in the inactive state. As such, when a sink device acquires the isochronous channel 640 while inactive, the sink device may simply monitor the channel state information conveyed via the update slot 644 to synchronize to the isochronous channel 640 upon a transition from the inactive state. For example, the update sub-event packet transmitted via the update slot 644 may convey that the isochronous channel 640 has transitioned to the active state as shown in FIG. 6A when the isochronous data transmitted via that isochronous channel 640 starts and/or resumes.

Furthermore, when the isochronous channel 640 is to be terminated (e.g., removed from memory at the source device and any sink device(s) because there is no more isochronous data to be transmitted or other reasons), the update sub-event packet transmitted via the update slot 644 may convey the termination event such that the isochronous channel 640 may then follow the timing diagram shown in FIG. 6C. In particular, as shown therein, the isochronous data is not present in the one or more isochronous slots 642 and the update sub-event is not present in the update slot 644 upon termination. Accordingly, the isochronous channel 640 may be removed from memory at the source device and the sink device(s) such that the source device would need to initiate procedures to prepare and activate the isochronous channel 640 and the sink device(s) would need to again listen to the periodic advertising stream 630 to transfer isochronous data via the isochronous channel 640.

Figure 7:
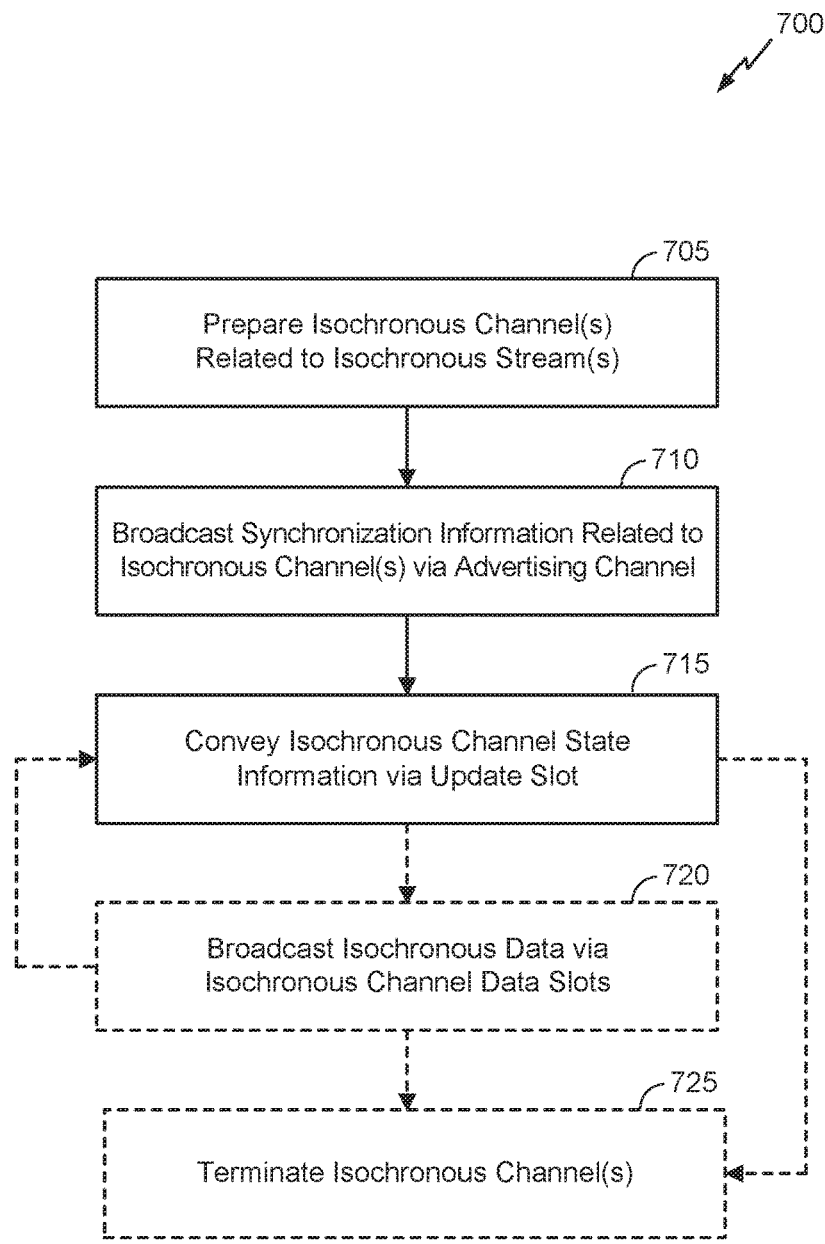
FIG. 7 illustrates an exemplary method to convey state changes related to one or more isochronous channels via an update slot, according to various aspects.

According to various aspects, FIG. 7 illustrates an exemplary method 700 to convey state information related to one or more isochronous channels via an update slot, as described in further detail above. More particularly, the method 700 shown in FIG. 7 may be performed at a source device broadcasting isochronous data in an isochronous stream that includes one or more time-related isochronous channels, wherein the source device may initially prepare one or more isochronous channels related to one or more isochronous streams at block 705. For example, in various embodiments, an application profile may request an isochronous stream with one or more time-related isochronous channels, wherein preparing the one or more isochronous channels may comprise allocating a stream identifier to each isochronous stream that has been requested and allocating a channel identifier to the isochronous channel(s) in each isochronous stream.

In various embodiments, the source device may then broadcast synchronization information related to the isochronous channel(s) via an advertising channel (e.g., a periodic advertising stream) at block 710. For example, as described in further detail above, the source device may broadcast one or more advertising packets on a primary advertising channel, which may point to one or more auxiliary advertising packets on a secondary advertising channel. The one or more auxiliary advertising packets may further point to one or more synchronization packets that further contain the synchronization information and are sent on a periodic basis, whereby the packets on the primary advertising channel and the secondary advertising channel may allow listening sink devices to receive the synchronization information via the secondary advertising channel and/or the periodic advertising stream. The synchronization information may include various parameters that allow the sink devices to acquire the isochronous channel(s), including a pointer to one or more slots in which the source device is scheduled to broadcast data packets via the isochronous channel(s). For example, the source device may initially broadcast the synchronization information with a data active flag set to zero to indicate no isochronous data is present on the isochronous channel(s). As such, the synchronization information may initially point to an update slot that the source device uses to broadcast control information related to the isochronous stream Accordingly, at block 715, the source device may convey state information related to the isochronous channel(s) via the update slot. For example, in response to a host at the source device setting an isochronous stream to be active such that there is isochronous data available to transmit, the source device may schedule and transmit a data packet via the update slot to indicate a transition to an active state. When available, the source device may broadcast such isochronous data via one or more data slots in the isochronous channel(s) at block 720 and continue to convey any relevant state information associated with the isochronous channel(s) via the update slot at block 715. For example, when there is no isochronous data available to transmit (e.g., because an audio stream has been paused), the state information conveyed via the update slot at block 715 may indicate a transition to the inactive state. If and/or when isochronous data becomes available to transmit (e.g., because the audio stream has been resumed), the state information conveyed via the update slot at block 715 may indicate a transition back to the active state and the source device may resume broadcasting the isochronous data via the one or more data slots in the isochronous channel(s) at block 720. Furthermore, if and/or when the isochronous channel(s) are to be terminated, the change to the terminated state may be conveyed via the update slot at block 715 and the information associated with the isochronous channel(s) may be removed from memory at block 725 to thereby terminate the isochronous channel(s).

Figure 8:
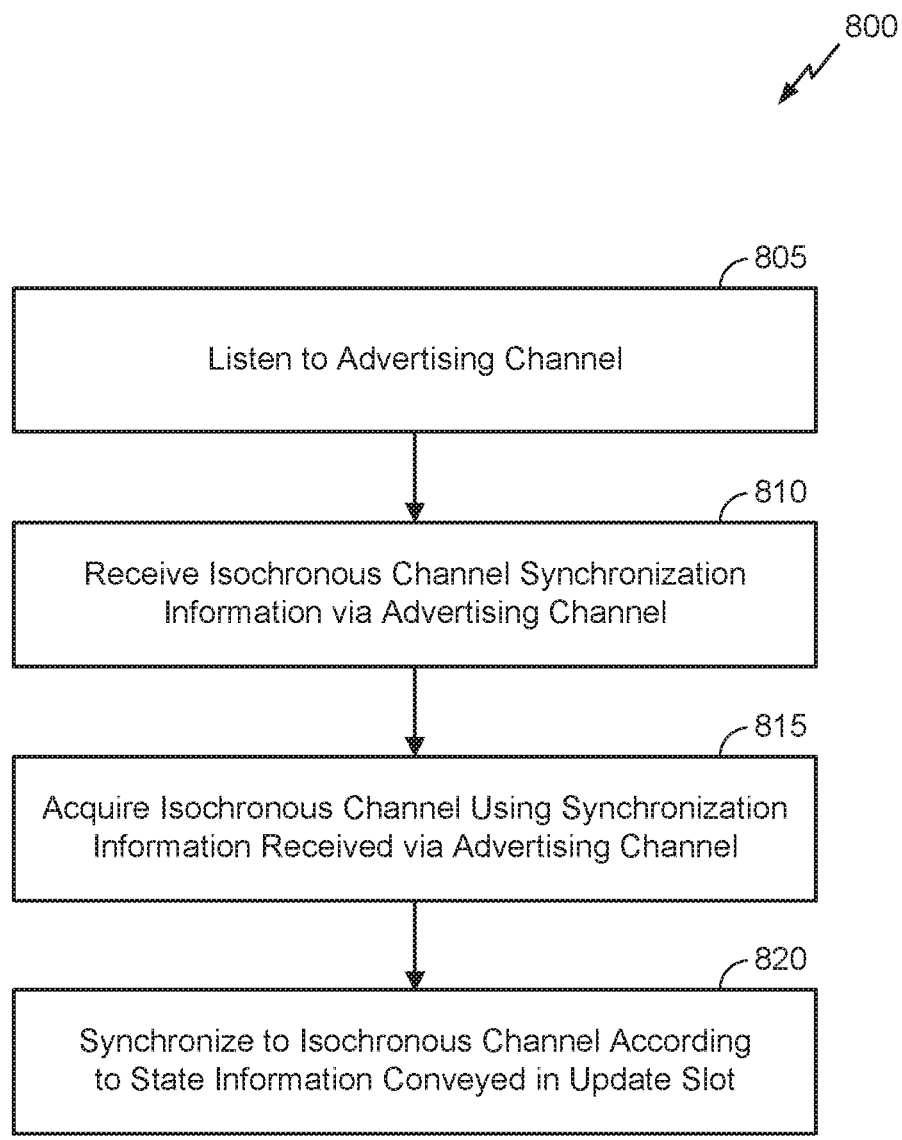
FIG. 8 illustrates an exemplary method to synchronize to an isochronous channel according to state changes conveyed via an update slot, according to various aspects.

According to various aspects, FIG. 8 illustrates an exemplary method 800 to synchronize to an isochronous channel according to state information conveyed in an update slot, as described in further detail above. More particularly, the method 800 shown in FIG. 8 may be performed at a sink device that has selected the isochronous channel, wherein the sink device may initially listen to an advertising channel at block 805 to acquire or re-acquire the isochronous channel from a broadcasting source device. For example, in various embodiments, the isochronous channel may comprise a Bluetooth LE Isochronous Connectionless (ICL) channel, which can be used to broadcast isochronous data within an ICL stream that includes one or more time-related ICL channels, and the advertising channel may comprise a periodic advertising stream as described in further detail above. As such, the source device may further broadcast synchronization information associated with each isochronous channel in the isochronous stream via one or more packets transmitted in the advertising channel to enable the receiving sink device(s) to use select and acquire the isochronous channel(s).

According to various embodiments, the sink device may therefore receive the synchronization information associated with the isochronous channel via the advertising channel at block 810. The sink device may then use the synchronization information received via the advertising channel to acquire (or re-acquire) the isochronous channel at block 815. For example, in various embodiments, the isochronous channel may include various parameters that are set at the source device broadcasting the isochronous data via the isochronous channel, as described in further detail above. Accordingly, the various parameters included in the synchronization information may allow the sink device to acquire the isochronous channel and thereby receive one or more data packets that are scheduled to be transmitted in one or more slots on the acquired isochronous channel. For example, where the isochronous channel has an active state at the time that the sink device acquires the isochronous channel, the synchronization information may point to one or more isochronous slots in which the source device is scheduled to broadcast data packets that contain isochronous data. Alternatively, in the event that the isochronous channel has an inactive state at the time that the sink device acquires the isochronous channel, the synchronization information may point to an update slot in which the source device broadcasts updated control information applicable to all isochronous channels that make up the isochronous stream. In either case, the source device may schedule update sub-event transmissions in the update slot to convey a state associated with the isochronous channel (e.g., active, inactive, or terminated).

Accordingly, in various embodiments, the sink device may synchronize to the acquired isochronous channel at block 820 according to the state information conveyed via the update slot. In particular, whenever a state change occurs on the isochronous channel, the broadcasting source device may convey the state change via the update sub-event, which may comprise a packet that identifies the isochronous channel and the new state associated with the isochronous channel. For example, while in an active state, isochronous data and the update sub-event may be received on the isochronous channel, wherein the update sub-event may be used to convey a change to an inactive state or a change to a terminated state. In the former case, the change to the inactive state may indicate that the isochronous data will no longer be present on the isochronous channel (at least temporarily). However, the update sub-event may still be present on the isochronous channel such that the sink device may remain synchronized to the isochronous channel via the update slot. As such, any change back to the active state or to a terminated state may be conveyed and synchronized via the update slot. In cases where the isochronous channel transitions to the terminated state, however, neither the isochronous data nor the update sub-event will be present thereafter, whereby the sink device would need to again listen to the advertising channel in order to receive the synchronization information to re-acquire the isochronous channel.

Figure 9:
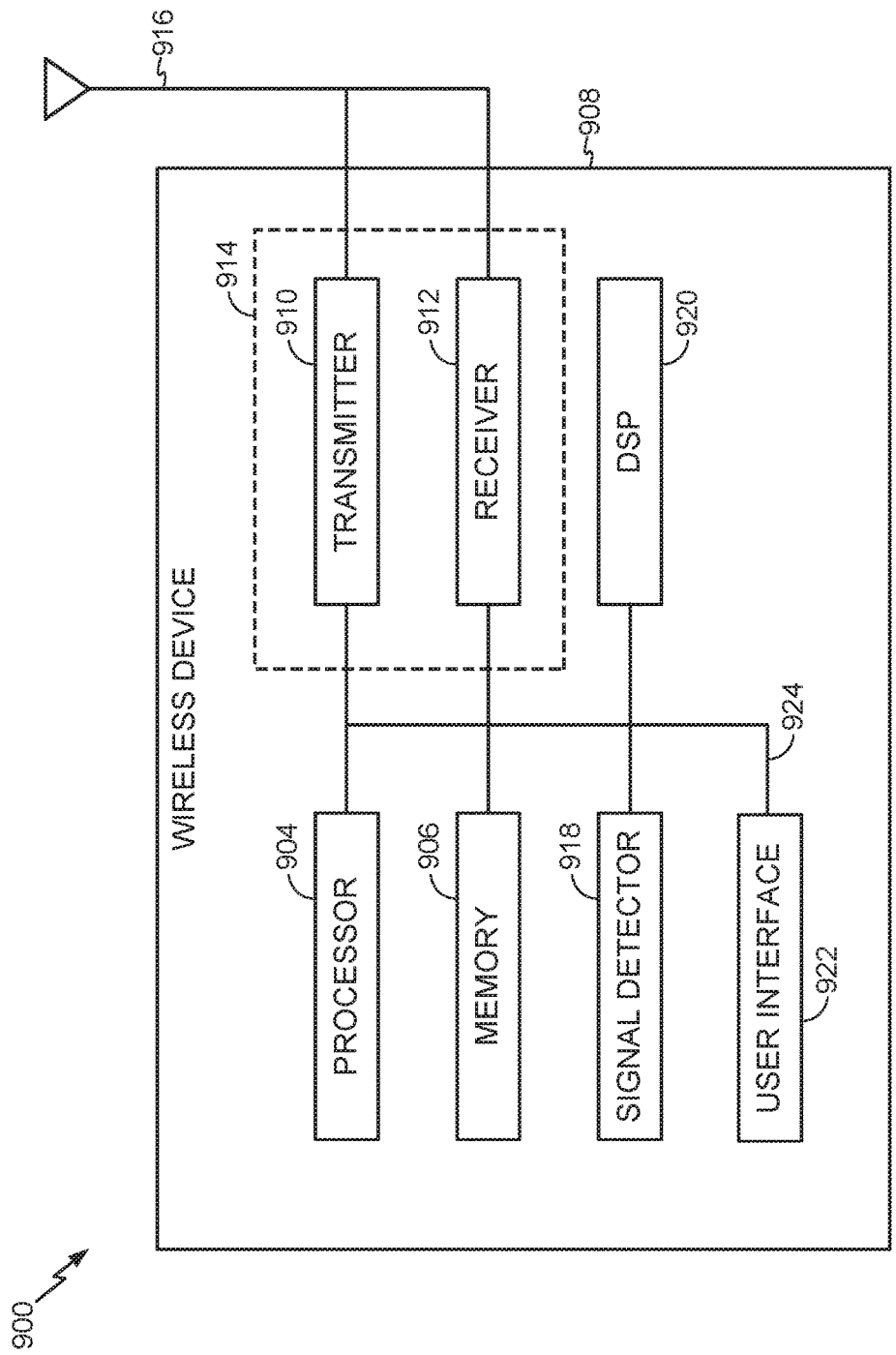
FIG. 9 illustrates an exemplary wireless device that can implement the various aspects and embodiments described herein.

According to various aspects, FIG. 9 illustrates an exemplary wireless device 900 that can implement the various aspects and embodiments described herein. For example, in various embodiments, the wireless device 900 shown in FIG. 9 may correspond to a source device (e.g., a broadcaster device) that can use an update slot associated with an isochronous channel to convey a current state, a state change, and/or other suitable state information associated with the isochronous channel (e.g., a connectionless channel that the source device uses to broadcast isochronous data to one or more sink devices). Alternatively and/or additionally, the wireless device 900 shown in FIG. 9 may correspond to a sink device that has selected or otherwise acquired the isochronous channel and synchronizes to the isochronous channel according to the state information that the source device conveys via the update slot. In various embodiments, the wireless device 900 may include a processor 904, a memory 906, a housing 908, a transmitter 910, a receiver 912, an antenna 916, a signal detector 918, a digital signal processor (DSP) 920, a user interface 922, and a bus 924. Alternatively, the functions associated with the transmitter 910 and the receiver 912 can be incorporated into a transceiver 914. The wireless device 900 can be configured to communicate in a wireless network that includes, for example, a base station, an access point, and the like.

In various embodiments, the processor 904 can be configured to control operations associated with the wireless device 900, wherein the processor 904 may also be referred to as a central processing unit (CPU). The memory 906 can be coupled to the processor 904, can be in communication with the processor 904, and can provide instructions and data to the processor 904. The processor 904 can perform logical and arithmetic operations based on program instructions stored within the memory 906. The instructions in the memory 906 can be executable to perform one or more methods and processes described herein. Furthermore, in various embodiments, the processor 904 can include, or be a component in, a processing system implemented with one or more processors. The one or more processors can be implemented with any one or more general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, combinations thereof, and/or any other suitable entities that can perform calculations and/or manipulate information. In various embodiments, the processing system can also include machine-readable media configured to store software, which can be broadly construed to include any suitable instructions, whether referred to as software, firmware, middleware, microcode, hardware description language, or otherwise. Instructions can include code in a source code format, a binary code format, an executable code format, and/or any other suitable format. The instructions, when executed on the one or more processors, can cause the processing system to perform one or more of the functions described herein.

In various embodiments, the memory 906 can include read-only memory (ROM), random access memory (RAM), and/or any suitable combination thereof. The memory 906 can also include non-volatile random access memory (NVRAM).

In various embodiments, the transmitter 910 and the receiver 912 (or the transceiver 914) can transmit and receive data between the wireless device 900 and a remote location. The antenna 916 can be attached to the housing 908 and electrically coupled to the transceiver 914. In some implementations, the wireless device 900 can also include multiple transmitters, multiple receivers, multiple transceivers, and/or multiple antennas (not illustrated). In various embodiments, the signal detector 918 can be used to detect and quantify the level associated with one or more signals received at the transceiver 914. The signal detector 918 can detect such signals as total energy, energy per subcarrier per symbol, power spectral density, and/or and in other ways. In various embodiments, the DSP 920 can be used to process signals, wherein the DSP 920 can be configured to generate a packet to be transmitted via the transmitter 910 and/or the transceiver 914. In various embodiments, the packet can include a physical layer protocol data unit (PPDU).

In various embodiments, the user interface 922 can include, for example, a keypad, a microphone, a speaker, a display, and/or other suitable interfaces. The user interface 922 can include any element or component that conveys information to a user associated with the wireless device 900 and/or receives input from the user.

In various embodiments, the various components associated with the wireless device 900 can be coupled together via a bus 924, which may include a data bus and a power bus, a control signal bus, and/or a status signal bus in addition to the data bus.

In various embodiments, the wireless device 900 can also include other components or elements not illustrated in FIG. 9. One or more components associated with the wireless device 900 can be in communication with another one or more components associated with the wireless device 900 via means that may comprise another communication channel (not illustrated) to provide, for example, an input signal to the other component.

In various embodiments, although various separate components are illustrated in FIG. 9, one or more components shown therein can be combined or commonly implemented. For example, the processor 904 and the memory 906 can be embodied on a single chip. The processor 904 can additionally, or in the alternative, contain memory, such as processor registers. Similarly, one or more functional blocks or portions thereof can be embodied on a single chip. Alternatively, the functionality associated with a particular block can be implemented on two or more chips. For example, the processor 904 can be used to implement not only the functionality described above with respect to the processor 904, but also to implement the functionality described above with respect to the signal detector 918 and/or the DSP 920.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, etc.).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for synchronizing to an isochronous channel, comprising:
   receiving, at a sink device, synchronization information associated with the isochronous channel via an advertising channel;
   acquiring, at the sink device, the isochronous channel according to the synchronization information received via the advertising channel; and
   synchronizing to the isochronous channel according to state information that a source device broadcasts in an update slot associated with the isochronous channel to indicate whether isochronous data is present on the isochronous channel.

2. The method recited in claim 1, wherein synchronizing to the isochronous channel according to the state information broadcasted in the update slot comprises:
   determining that the state information indicates that the isochronous channel is in an active state such that the isochronous data is present in one or more data slots associated with the isochronous channel; and
   receiving the isochronous data via the one or more data slots.

3. The method recited in claim 2, wherein synchronizing to the isochronous channel according to the state information broadcasted in the update slot comprises:
   determining that the state information indicates that the isochronous channel has transitioned from the active state to an inactive state such that the isochronous data is no longer present in the one or more data slots; and
   continuing to synchronize to the isochronous channel according to the state information that the source device broadcasts in the update slot.

4. The method recited in claim 2, wherein the synchronization information received via the advertising channel points to the one or more data slots while the isochronous channel is in the active state.

5. The method recited in claim 1, wherein synchronizing to the isochronous channel according to the state information broadcasted in the update slot comprises:
   determining that the state information indicates that the isochronous channel is in an inactive state such that the isochronous data is not present in one or more data slots associated with the isochronous channel; and
   continuing to synchronize to the isochronous channel according to the state information that the source device broadcasts in the update slot.

6. The method recited in claim 5, wherein continuing to synchronize to the isochronous channel according to the state information that the source device broadcasts in the update slot comprises:
   determining that the state information indicates that the isochronous channel has transitioned from the inactive state to an active state such that the isochronous data has become available in the one or more data slots; and
   receiving the isochronous data via the one or more data slots.

7. The method recited in claim 5, wherein the synchronization information received via the advertising channel points to the update slot while the isochronous channel is in the inactive state.

8. The method recited in claim 1, wherein synchronizing to the isochronous channel according to the state information broadcasted in the update slot comprises:
   determining that the state information indicates that the isochronous channel has transitioned to a terminated state such that the isochronous data is not present in one or more data slots associated with the isochronous channel and the state information is not present in the update slot; and
   removing information associated with the isochronous channel from memory.

9. The method recited in claim 1, wherein an isochronous stream that comprises the isochronous channel further comprises one or more time-related isochronous channels, and wherein the state information that the source device broadcasts in the update slot further comprises state information related to the one or more time-related isochronous channels.

10. The method recited in claim 1, wherein the isochronous channel comprises a Bluetooth Low Energy Isochronous Connectionless (ICL) channel.

11. A wireless device, comprising:
    a receiver configured to receive synchronization information associated with an isochronous channel via an advertising channel; and
    one or more processors configured to:
    acquire the isochronous channel according to the synchronization information received via the advertising channel; and
    synchronize to the isochronous channel according to state information that a source device broadcasts in an update slot associated with the isochronous channel to indicate whether isochronous data is present on the isochronous channel.

12. The wireless device recited in claim 11, wherein the receiver is further configured to receive the isochronous data via one or more data slots associated with the isochronous channel in response to the state information indicating that the isochronous channel is in an active state such that the isochronous data is present in the one or more data slots.

13. The wireless device recited in claim 12, wherein the one or more processors are further configured to:

determine that the state information indicates that the isochronous channel has transitioned from the active state to an inactive state such that the isochronous data is no longer present in the one or more data slots; and continue to synchronize to the isochronous channel according to the state information that the source device broadcasts in the update slot.

14. The wireless device recited in claim 12, wherein the synchronization information received via the advertising channel points to the one or more data slots while the isochronous channel is in the active state.

15. The wireless device recited in claim 11, wherein the one or more processors are further configured to:

determine that the state information indicates that the isochronous channel is in an inactive state such that the isochronous data is not present in one or more data slots associated with the isochronous channel; and continue to synchronize to the isochronous channel according to the state information that the source device broadcasts in the update slot.

16. The wireless device recited in claim 15, wherein the receiver is further configured to receive the isochronous data via one or more data slots associated with the isochronous channel in response to the state information indicating that the isochronous channel has transitioned from the inactive state to an active state such that the isochronous data has become available in the one or more data slots.

17. The wireless device recited in claim 15, wherein the synchronization information received via the advertising channel points to the update slot while the isochronous channel is in the inactive state.

18. The wireless device recited in claim 11, further comprising:

a memory configured to store information associated with the isochronous channel, wherein the one or more processors are further configured to remove the information associated with the isochronous channel from the memory in response to the state information indicating that the isochronous channel has transitioned to a terminated state.

19. The wireless device recited in claim 11, wherein the state information that the source device broadcasts in the update slot further comprises state information related to one or more additional isochronous channels that are time-related to the isochronous channel within an isochronous stream that comprises the isochronous channel.

20. The wireless device recited in claim 11, wherein the isochronous channel comprises a Bluetooth Low Energy Isochronous Connectionless (ICL) channel.

21. An apparatus, comprising:

means for receiving synchronization information associated with an isochronous channel via an advertising channel;

means for acquiring the isochronous channel according to the synchronization information received via the advertising channel; and means for synchronizing to the isochronous channel according to state information that a source device broadcasts in an update slot associated with the isochronous channel to indicate whether isochronous data is present on the isochronous channel.

22. The apparatus recited in claim 21, further comprising:

means for receiving the isochronous data via one or more data slots associated with the isochronous channel in response to the state information indicating that the isochronous channel is in an active state such that the isochronous data is present in the one or more data slots.

23. The apparatus recited in claim 22, wherein the synchronization information received via the advertising channel points to the one or more data slots while the isochronous channel is in the active state.

24. The apparatus recited in claim 21, further comprising:

means for determining that the state information indicates that the isochronous channel is in an inactive state such that the isochronous data is not present in one or more data slots associated with the isochronous channel; and means for continuing to synchronize to the isochronous channel according to the state information that the source device broadcasts in the update slot.

25. The apparatus recited in claim 24, wherein the synchronization information received via the advertising channel points to the update slot while the isochronous channel is in the inactive state.

26. The apparatus recited in claim 21, further comprising:

means for removing information associated with the isochronous channel from memory in response to the state information indicating that the isochronous channel has been terminated.

27. A computer-readable storage medium, comprising code for causing a wireless device to:

receive synchronization information associated with an isochronous channel via an advertising channel;

acquire the isochronous channel according to the synchronization information received via the advertising channel; and synchronize to the isochronous channel according to state information that a source device broadcasts in an update slot associated with the isochronous channel to indicate whether isochronous data is present on the isochronous channel.

* * * * *